United States Patent
Myers et al.

(10) Patent No.: US 9,355,008 B2
(45) Date of Patent: May 31, 2016

(54) PERFORMANCE ANALYZER FOR SELF-TUNING SYSTEM CONTROLLER

(75) Inventors: Douglas B. Myers, San Jose, CA (US); Leo Leung, Oakland, CA (US); Liem Manh Nguyen, Lincoln, CA (US); Rico Gundermann, Sulza (DE)

(73) Assignee: Hewlett Packard Enterprise Development LP, Houston, TX (US)

( * ) Notice: Subject to any disclaimer, the term of this patent is extended or adjusted under 35 U.S.C. 154(b) by 378 days.

(21) Appl. No.: 13/162,234

(22) Filed: Jun. 16, 2011

(65) Prior Publication Data

US 2012/0324097 A1    Dec. 20, 2012

(51) Int. Cl.
*G06F 15/173* (2006.01)
*G06F 11/34* (2006.01)

(52) U.S. Cl.
CPC ........ *G06F 11/3433* (2013.01); *G06F 11/3452* (2013.01); *G06F 11/3409* (2013.01); *G06F 11/3419* (2013.01); *G06F 2201/81* (2013.01)

(58) Field of Classification Search
CPC . G06N 3/126; G06F 11/3433; G06F 11/3452; G06F 11/3409; G06F 11/3419; G06F 2201/81
USPC ......................................................... 709/224
See application file for complete search history.

(56) References Cited

U.S. PATENT DOCUMENTS

| | | | |
|---|---|---|---|
| 7,068,598 B1 | 6/2006 | Bryson et al. | |
| 7,401,244 B2 | 7/2008 | Hellerstein et al. | |
| 2007/0094163 A1* | 4/2007 | Bowerman et al. | 706/13 |
| 2009/0122701 A1 | 5/2009 | Goldman et al. | |
| 2009/0319060 A1* | 12/2009 | Wojsznis et al. | 700/30 |
| 2009/0327481 A1 | 12/2009 | Rickard et al. | |
| 2010/0023645 A1* | 1/2010 | Foygel et al. | 709/232 |
| 2010/0085887 A1 | 4/2010 | Ray et al. | |
| 2010/0135155 A1 | 6/2010 | Sankhavaram | |
| 2010/0153928 A1* | 6/2010 | Livshits et al. | 717/132 |
| 2011/0179424 A1* | 7/2011 | Saxe et al. | 719/313 |

OTHER PUBLICATIONS

Andrade, Sandro Santos, et al., "Engineering Components for Flexible and Interoperable Real-Time Distributed Supervision and Control Systems," IEEE Conference on Emerging Technologies and Factory Automation, pp. 376-383, Sep. 25-28, 2007 (available online Jan. 7, 2005).

(Continued)

*Primary Examiner* — June Sison
*Assistant Examiner* — Steven Nguyen
(74) *Attorney, Agent, or Firm* — Pearl Cohen Zedek Latzer, LLP

(57) ABSTRACT

A performance analyzer for a self-tuning system controller, and a method for performance analysis. A range of values for a control parameter of a system controller for a system is split into a plurality of sub-ranges, need is determined to obtain a data point for a sub-range of the plurality of sub-ranges based on a criteria, wherein said sub-range is adjacent to a sub-range having a best performance value that identifies a best performance for the system, the control parameter is set to a value to generate the data point for the adjacent sub-range; and the control parameter set to a value for system performance, based on a search range determined from a window of data points that includes the generated data point.

19 Claims, 8 Drawing Sheets

(56) References Cited

OTHER PUBLICATIONS

He, Hai, et al., "A Generic Framework for Modeling Heterogeneous Real-Time Systems," Journal of Computer Standards & Interfaces, vol. 28, Issue 1, Jul. 2005.

Hewlett-Packard Development Company, L.P., "Overview: HP Integrated Archive Platform 2.1," http://h18000.www1.hp.com/products/quickspecs/13614_div/13614_div.html#Configuration%20Information (available as of Mar. 29, 2011).

Thottethodi, Mithuna, et al, "Self-Tuned Congestion Control for Multiprocessor Networks," The Seventh International Symposium on High-Performance Computer Architecture, Jan. 19-24, 2001 (Date of Current Version Aug. 7, 2002).

Thottethodi, Mithuna, et al, "Exploiting Global Knowledge to Achieve Self-Tuned Congestion Control for k-Ary n-Cude Networks," IEEE Transactions on Parallel and Distributed Systems, vol. 15, No. 3, pp. 257-272, Mar. 2004.

* cited by examiner

PERFORMANCE ANALYZER FOR SELF-TUNING SYSTEM CONTROLLER

BACKGROUND

Congestion control techniques, such as throttling, may be used in many types of computer systems to avoid instabilities and/or performance degradations that can occur when a system is overloaded with inputs.

For example, a server system, such one providing data on the Internet, may use a system controller known as a throttle (sometimes called a bandwidth throttle) to limit the rate at which the server system accepts data requests to avoid overloading the server system's processing capacity. With such systems, client requests for data can vary over time, and at peak times those requests can exceed the capacity of the server, causing congestion and bottlenecks. Data failures may result, and in some cases, server crashes can occur. To prevent such occurrences in such server systems, a throttle may be implemented, for example, to control the number of requests the system responds to within a specified period of time.

Congestion control techniques like throttling have application beyond server systems and system controllers like throttles may be used to perform congestion control in other types of computer processing. In general, a system controller, like a throttle, may be introduced to a system to regulate input, insure stability of the system, optimize throughput and insure quality of service.

Though congestion control may have wide application in computer systems, the process of determining a proper system control point (e.g. a proper throughput or input/output level) in a given system to achieve and maintain an optimal performance can pose significant challenges. For example, with server systems using a throttle, the determination of a proper throttling point may depend on many factors, including computer hardware used, number of processing resources available, types and size of data being requested (stored or retrieved), and client usage patterns. Additionally, even if an optimal control point for a system controller can be found at one time for a given system, the optimal level may not be static. Factors influencing the optimal level may change (e.g. client usage patterns, equipment brought on-line and/or taken off-line, etc.), and accordingly the "optimal" system control point for the system may change over time.

Thus, in many systems a system controller, such as a throttle, must be consistently watched and adjusted, for example, by a system administrator. Determining the proper system control level may be done for some systems, for example, by using a trial and error approach of manually adjusting a system control value (such as the throttling rate) and measuring the relative performance changes until desired performance is seen. Even if a factory setting (of a reasonable system control setting for typical use cases) is used, the factory setting may not be ideal for every situation.

BRIEF DESCRIPTION OF THE DRAWINGS

Embodiments, both as to organization and method of operation, together with objects, features, and advantages thereof, may be understood by reference to the detailed description when read with the accompanying drawings in which.

Figure 1:
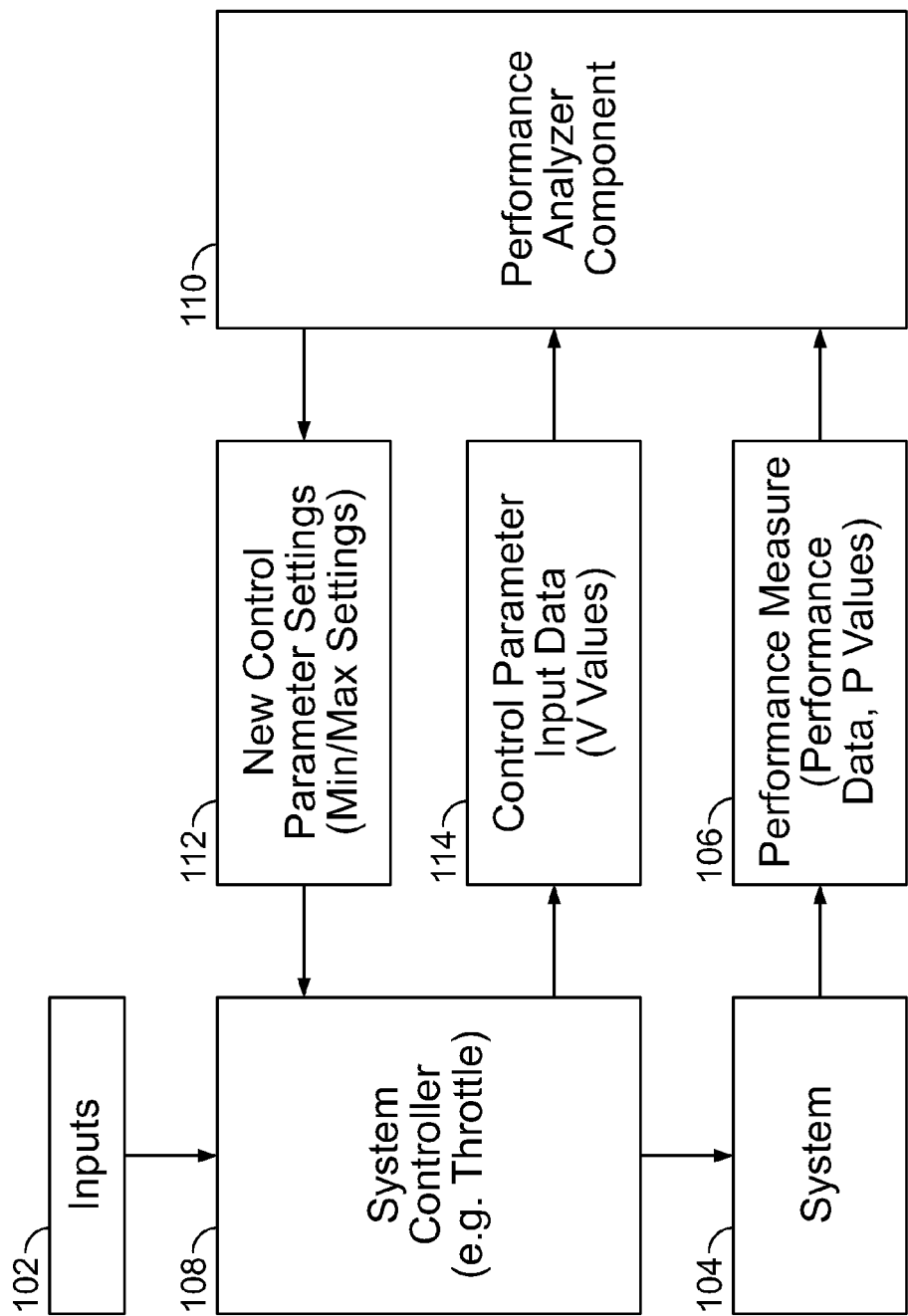
FIG. 1 illustrates a system for providing performance analysis in one embodiment.

Where considered appropriate, reference numerals may be repeated among the figures to indicate corresponding or analogous elements.

DETAILED DESCRIPTION

In the following detailed description, numerous specific details are set forth in order to provide a thorough understanding of different embodiments. However, it will be understood by those of ordinary skill in the art that embodiments may be practiced without these specific details. In other instances, well-known methods, procedures and components have not been described in detail so as not to obscure the embodiments.

An embodiment may provide a system, method and computer-readable medium for performance analysis, capable of determining an optimal (or near-optimal) setting for a system controller that may regulate a computer-controlled system. For example, a performance analyzer component in accordance with an embodiment may allow a system controller, like a throttle, to become self-tuning and require no administrative configuration.

A performance analyzer component in accordance with an embodiment may also allow for dynamic, adaptive adjustment of system controller settings, to locate new settings for optimal (or near optimal) system performance, for example, as conditions influencing the performance of the system change. A method for self-tuning a performance analyzer, may include, steps of splitting a range of values for a control parameter of a system controller for a system into a plurality of sub-ranges, determining there is a need to obtain a data point for a sub-range of the plurality of sub-ranges based on a criteria, where, for example the sub-range is adjacent to a sub-range having a best performance value that identifies a best performance for the system, setting the control parameter to a value to generate the data point for the adjacent sub-range and setting the control parameter to a value for system performance, based on a search range determined from a window of data points that includes the generated data point. A system may include a memory and a processor, the memory storing program instructions that when executed by the processor function as a performance analysis engine configured to perform, for example, such steps of splitting, determining and setting as described above.

An embodiment may be used to optimize many different measures of performance and is applicable to many different computer systems. As one example, the performance analyzer component may be applied to a system controller that is a throttle for a server system, such as a system for document and email archiving like the HP Integrated Archiving Platform (IAP) from the Hewlett-Packard Company of Palo Alto, Calif. Other example applications include, but are not limited to, e.g., a performance analyzer to control throttling of incoming traffic in a network (to optimize throughput in a network) or a performance analyzer to control concurrency in a central processor unit or in memory-intensive data processing (e.g., encryption, cryptographic hashing, indexing, etc.) to maximize overall processing rate.

In general, a system controller may regulate the minimum and/or maximum of an input to a system. In such a case, the control parameters in one embodiment may be for the input of the minimum value the input can have, the maximum value the input can have, or both. Data packet size is one example where a system controller may control both the minimum and maximum size of a data packet processed by a system, such as for example by splitting larger packets into smaller ones to control the maximum size, or combining smaller packets into bigger ones to control the minimum size. The term "throttle" may be used to describe a system controller that regulates only the maximum of an input. A throttle-type controller may be used in situations where it is possible to block transactions to limit the maximum number of transactions, and where it is not possible to control the minimum number of transactions coming into a system. In situations where the input level (e.g. number of incoming transaction requests) coming into the throttle is always greater than a maximum number allowed by the throttle, the throttle may be referred to as a "saturated throttle".

Examples provided herein apply to situations for finding optimum values for a maximum of an input (or control variable) to a system, a minimum of an input (or control variable) to a system or both. It applies to system controllers that control two parameters for an input (like the max and min size of a data packet) and also to system controllers, like throttles, that control one parameter for an input (like the maximum number of transactions allowed into a system).

Though in examples presented, the performance analyzer operates to analyze best range (min and/or max) of a single input, it is possible to use the techniques presented in situations also where the controller operates to regulate multiple inputs. For example, a performance analyzer according to an embodiment could be used to regulate multiple inputs (e.g. where each input was regulated by either one parameter, like a maximum parameter or two parameters, like a maximum and a minimum parameter). In such a case, the performance analyzer would be extended to search in multiple dimensions, each input being a different dimension of the search space.

In operation, a performance analyzer component of an embodiment may receive real-time performance data from the system being controlled (server system or other application) and analyze that data relative to a control parameter monitored for system control. In an example where a system controller such as a throttle regulates a server, such as an HP IAP system, the control variable may be the number of concurrent active transactions allowed into the system. In other examples, other control variables maybe selected (such as data packet size or number of concurrent networking requests for networking applications, or number of active data processing jobs for a data processing application, or number of transactions for a database system).

The performance analyzer component may analyze collected real-time data to determine a value for a best system control point (such as a best throttling point), and then may continue to monitor the data, adjusting the system control set points at intervals, if needed, to augment system performance and, for example, change the system controller to different control settings to acquire specific data in performing analysis.

The control variable for a server system like an IAP may be, for example, the number of concurrent transactions accepted through a storage portal. In such an example, a system controller, such as a throttle, may limit the maximum number of concurrent transactions, blocking excessive transaction requests until currently running transactions complete. Performance of such a system being regulated by the throttle may be measured or quantified in terms of storage speed (MBs/second), throughput (transactions/second), response time (requests/seconds), etc. For other systems other control variables and other performance measures can be used.

In analysis, data points, such as for example data points (V, P), may be continually fed to the performance analyzer, where V may be an average value of the variable being controlled for a period of time (e.g., number of active transactions or an average of the number of transactions occurring in a given period of time), and P may be the average performance of the system being regulated for that same period of time. These data points may be analyzed and, for example, may be plotted on a graph, e.g. P vs. V, to form a performance curve.

In one embodiment, the performance analyzer may analyze the data (e.g., the P, V curve data) to determine an optimal (or near-optimal) control value that can generate and maintain a peak performance for the system. In one implementation, the performance analyzer may instruct the system controller, e.g. using a controller-to-analyzer interface, to limit the control variable to within a search range (or in the case of a throttle to a maximum value, starting from zero, for example) that generates better performance. Initially, this search range may be a large or wide range, for example where the performance analyzer has only a few points for analysis in the beginning. The search range then may be reduced, or narrowed to hone in on optimal system controller settings (e.g. an optimum maximum input setting in the case of a throttle) as more data becomes available to the performance analyzer over time.

The performance analyzer may use or maintain a window of the most current data points or data items to perform the analysis, thereby, for example, allowing for change in system circumstances to factor into the analysis. For example, the window may determine a group of data points that are used in any iteration of the analysis. The window may be set to include a selected number of data points (10, 50, 100 . . . etc.). Points may be included and removed from the window as the data points are received, such as on a first-in-first-out (FIFO) basis where the most recent (10, 50, 100 . . . etc.) data points are included in the window.

Additionally, the performance analyzer may also control the system controller, by at times setting specific control values for the system controller, to search for and gather performance data in particular ranges (or sub-ranges). As analysis progresses, the performance analyzer, can provide a clearer indication of where optimal values for system controller operation reside. For example, the performance analyzer may determine that there is a need to obtain a data point for a sub-range based on a criteria (a need criteria), wherein said sub-range is adjacent to a sub-range having a best performance value and the performance analyzer may set the control parameter to a value to generate the data point for the adjacent sub-range.

The need may be determined based on the criteria that a performance value has not been determined for the adjacent sub-range for a period of time. The need may be further determined based on a criteria such as counting a number of data points received from a stream of data points and determining whether the total number data points received surpasses a threshold during which time a performance has not been determined for the adjacent sub-range. Other need criteria may also be used.

By this procedure, the performance analyzer engine may temporarily "force" the system controller to a parameter setting, for example away from an optimal setting for the purpose of gathering data or testing a possible new setting. Forcing here may mean to provide control settings to the system controller to temporarily move control parameters away from an optimal setting for performance and direct the system controller to operate at a setting that will allow performance analyzer engine to gather performance data to test or evaluate another setting (or sub-range of settings, either within a search range or outside of one) for best performance or optimality.

While an example is presented in the context of a server system, such as an IAP server, the performance analyzer component may be configured, as can be easily seen, to optimize many different types of performance aspects. For example, where performance can be measured relative to a control variable controlled by a system controller, the performance analyzer component can make automatic adjustments to enhance processing efficiencies Performance Analysis Reference is now made to FIG. 1, which describes a system for providing performance analysis in one embodiment. In FIG. 1, inputs 102 arrive at system controller 108 for processing by system 104. System 104, for example, may be a server system, such as an HP Integrated Archiving Platform (IAP) for processing data archiving requests. Inputs 102 in such an example may be transaction requests from a number of connections trying to store data. System 104 may be another type of system as well, such as a network, and in such cases inputs 102 may be data packets going into the network. System 104 may also provide a performance measure 106. In the example of a server system such as an IAP, performance measure 106 may be store rate measured in Megabytes per seconds. In other examples, performance measure 106 may be data transfer rate measured in Megabytes per second (e.g. in the case of a network), or transactions per second for a transaction processing application. Performance measure 106 may show the average performance of system 104 for a period of time (such as system performance every minute or every hour). Performance measure 106 may be output on a periodic basis corresponding to a period of time, providing a performance measure 106 (a P value) for each period.

To maximize the performance measure 106 of system 104 in relation to inputs 102, system controller 108, such as a throttle, may be provided. In the example of a throttle regulating an IAP system, system controller 108, for example, may regulate the number of requests system 104 may process in a given instant. In more general terms, performance analyzer component 110 may regulate control parameters used by system controller 108 by providing control parameter settings 112 (e.g. min/max values for a parameter controlled by system controller 108). Performance analyzer component 110, may allow system controller 108 to become self-tuning and performance analyzer component 110 also allow for automatic and dynamic, adaptive adjustment of system controller 108, for example as conditions influencing the performance of system 104 change.

Performance analyzer component 110 may analyze performance measure 106 (the P value-performance data) in relation to corresponding parameter settings of system controller 108 to generate control parameter settings 112. Each P value of performance measure 106 (obtained for each period) may correspond to a V value of control parameter input 114, where each V value may reflect an average value of the parameter being controlled for that period of time. Control parameter input 114 (V values) may come from system controller 108 in one example (as shown in FIG. 1), but in other examples control parameter input 114 may come from other sources, such as system 104. Performance analyzer component 110, may receive a stream of P values of performance measure 106 and a stream of V values of control variable input 114 and use data from such streams to generate control parameter settings 112 (used to operate system controller 108).

Figure 2:
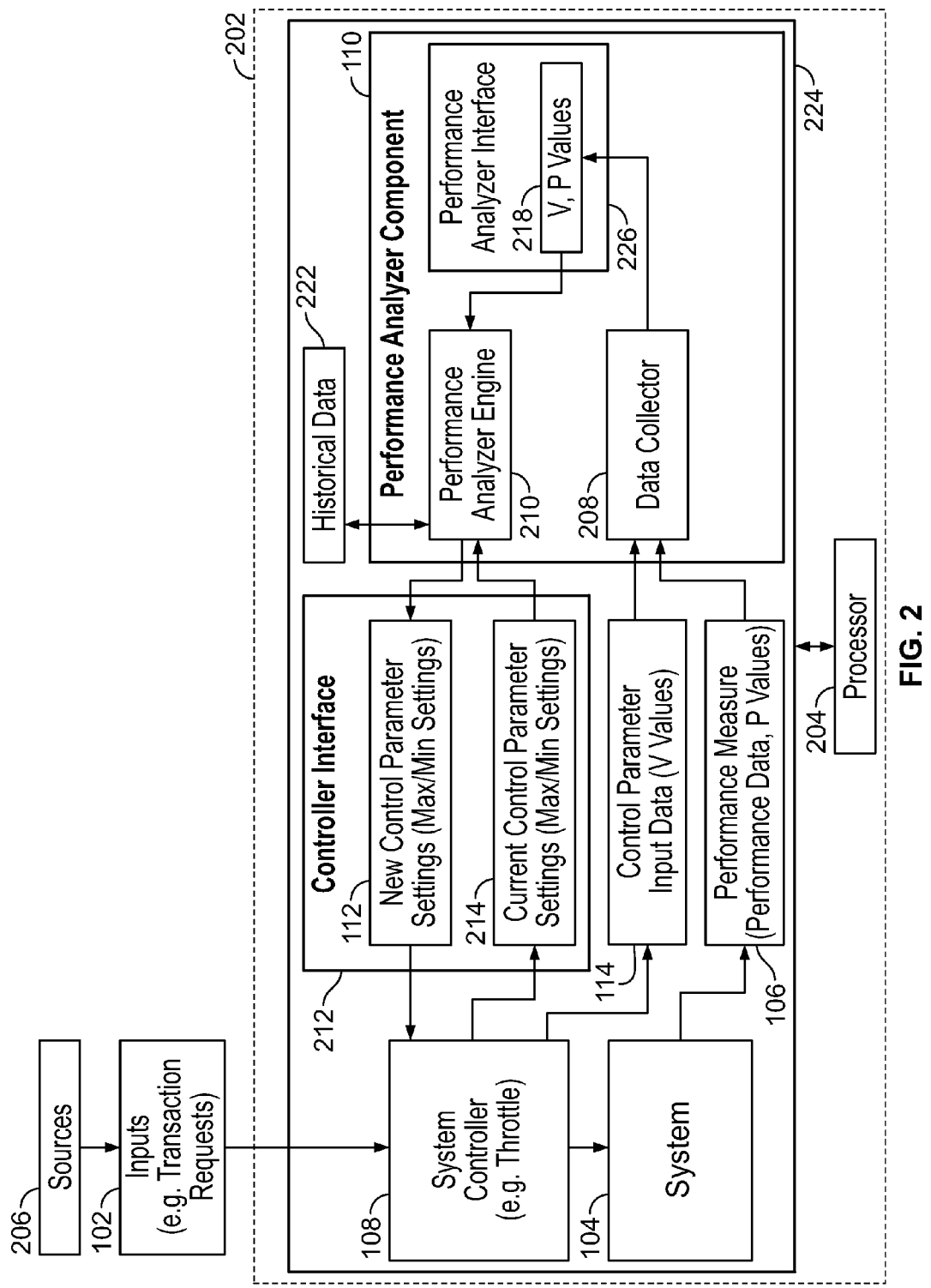
FIG. 2 illustrates a schematic of a system in one embodiment.

Reference is now made to FIG. 2, which illustrates in further detail a system for computer system performance analysis in one embodiment. FIG. 2 depicts system 104 maintained on computer system 202 and operated by processor 204. System 104 in this example may be a data archiving system such as the HP Integrated Archiving Platform (IAP), mentioned above. System 104 may also be other systems. Processor 204 may be one processor or a number of individual processors, e.g. operating as a distributed processing system and each operating one or more of the components of computer system 202.

Sources 206 may forward inputs 102. In the case of a server system (like an IAP), sources 206 may be computer users or institutional servers, like company computer systems, and inputs 102 may be transaction processing requests transmitted for processing by system 104, submitted by such sources 206. System 104 may generate performance measures 106 based on the system 104's processing of inputs 102. To regulate input to system 104, processor 204 may operate system controller 108, in this example a throttle, to control the number of transaction processing requests 102 received by system 104 at a given time.

Processor 204 may also operate performance analyzer component 110 to control system controller 108's operation. Performance analyzer component 110, as stated, may allow system controller 108 to become self-tuning and also allow for automatic and dynamic, adaptive adjustment of system controller 108. In one example, performance analyzer component 110 may include data collector 208 and performance analyzer engine 210. Bi-directional communication between system controller 108 and performance analyzer engine 210 may be facilitated using controller interface 212. Performance analyzer component 110 may also include performance analyzer interface 226 for passing data from data collector 208 to performance analyzer engine 210.

Performance analyzer component 110 and its elements (e.g. data collector 208, performance analyzer engine 210 and performance analyzer interface 226), as well as system controller 108, system 104 and controller interface 212 may be software modules, for example, elements programmed in computer code that may be stored in memory 224 and accessed for operation by processor 204 (e.g. having their functionality carried out by processor 204). Each of the elements e.g. 110 (including 208, 210, 226), 108, 104, 212 when executed by processor 204, perform, for example, as described herein. In addition to RAM memory operated by processor 204 and included in memory 224, memory 224 may also include for example, server storage (from which each of the modules 110 (208, 210, 226), 108, 104, 212 may be downloaded and installed e.g. to processor memory such as the RAM), portable memory such as compact disk (CD) memory and/or DVD memory and/or system memory, such as a hard drive or solid state drive (SSD) on which modules 110 (208, 210, 226), 108, 104, 212 may already be installed. In another example, one or more of the elements of performance analyzer component 110 may be implemented in circuitry as computer hardware elements.

Data collector 208 may obtain and organize data that is used for performance analysis in controlling system controller 108. Data collector 208 may collect data values and generate, for example, data points (V, P) 218, which may be continually fed to performance analyzer engine 210 (e.g. in a stream of data points). Data point V of (V, P) 218 may come from control parameter input data 114 (e.g. the average value of the variable being controlled by system controller 108 for a period of time). Data point P of (V, P 218) may come from performance measure 106 (e.g. the average performance of system 104 for that same period of time). In the example where system controller 108 is a throttle regulating an IAP archiving server, control parameter input data 114 may be the number of active transactions at a given instant and performance measure 106 may be performance data on system 104 (e.g. the rate at which data is being stored in MB/sec). Streams of control parameter input data values 114 and streams of performance measure data 106 may be organized by data collector 208 into a stream of V, P values 218. These V, P values 218 may be analyzed by performance analyzer engine 210.

In one example, performance measure (P value) 106 may come from system 104 (e.g. by operation of system 104 by processor 204). System 104 and data collector 208 may operate via an interface (not shown) for transmitting data from system 104 to data collector 208. In another example, performance measure (P value) 106 may come from monitoring systems (not shown) that may be coupled to system 104 and operated by processor 204 (or other processors). Control parameter data input (V value) 114 may come from different sources, such as system 104, a monitoring system (not shown) or system controller 108. Because, in one example (where system controller 108 is a throttle monitoring an IAP system) system controller 108 may be monitoring the average number of active concurrent transactions being processed by system 104, the information may come directly from system controller 108 (which is shown in FIG. 2). System controller 108 may be an element that is separate from system 104, or system controller 108 may be part of system 104 (e.g. part of an IAP system).

Performance analyzer engine 210 may obtain current control parameter settings 214 from system controller 108, analyze the provided data, V, P values 218 (e.g. coming from inputs 114, 106), and provide to system controller 108 (e.g. via controller interface 212) new or updated maximum and/or minimum values 112 for the control parameter system controller 108 is regulating (e.g., in the case of the IAP system, performance analyzer engine 210 may provide a value for the maximum or minimum number of concurrent active transactions, $N_{tran}$ max/min, system controller 108 may allow in order to optimize its performance). Performance analyzer engine 210 may continue to monitor system performance by obtaining updated V and P values 114, 106 (e.g. obtaining from data collector 208 a stream of V, P values 218 showing the number of concurrent active transactions and performance data).

Performance analyzer engine 210 may make adjustments to the min/max control parameter setting values 112 (e.g. $N_{tran}$ min/max) and provide the updated information (or new settings) to system controller 108 (through controller interface 212) to maintain system performance at an optimal (or near optimal) level as the performance data changes. The updated adjustments to the min/max control parameter setting values 112 ($N_{tran}$ max/min) may be made dynamically, and in real-time (e.g. on-the-fly). The adjustments may be provided continuously or periodically, for example, at a predetermined interval or at other times to system controller 108 by the performance analyzer engine 210. In an example of operation, the performance analyzer engine 210 may always determine both a minimum and maximum of the optimal range (e.g. $N_{tran}$ Min/Max), but may only adjust the minimum or maximum of the system controller 108 depending on the type of controller. For example, if the controller is a throttle (only controlling the maximum), then the performance analyzer may set the throttle control parameter in accordance with the optimal maximum found (e.g. $N_{tran}$ Max) and will not try to set the minimum (e.g. $N_{tran}$ Min). In other examples, performance analyzer engine 210 may determine and provide both minimum and maximum values or determine and provide just one of either the optimal minimum or maximum optimum values for a control parameter of system controller 108.

In operation, performance analyzer component 110 (e.g. using performance analyzer engine 210) may initially call (or otherwise access data from) system controller 108 to get initial minimum and maximum settings for the control parameter to be regulated and use these initial minimum and maximum settings for an initial search range. For example in FIG. 2, performance analyzer engine 210 may receive current control parameter settings 214 (initially, the initial minimum and maximum settings). From the initial search range, performance analyzer engine may then receive (V, P) values 218, analyze those values 218 and then, narrow, broaden or otherwise change the search range, if needed, and provide to system controller 108 new control parameter settings 112 ($N_{tran}$ Min/Max) as the (V, P) values 218 (from V values 114, and P values 106) change.

Though the performance analyzer engine 210 may obtain the current control parameter settings (e.g. 214) from system controller 108 and performance analyzer engine 210 may use those settings as its initial search range, it does not assume that the initial settings are at the limits of the possible settings for the control parameter. For example, in analysis performance analyzer engine 210 may try to go outside the initial range (to broaden or otherwise change the initial range) if the performance analysis indicates to do so.

In analyzing a range for optimality, performance analyzer engine 210 may split (or divide) the initial range (e.g. obtained from current control parameter settings 214 of system controller 108) into a number of smaller ranges (or sub-ranges) for analysis. If performance analyzer engine 210 obtains an initial range of possible control parameter settings between 0 and 100, performance analyzer engine 210 may split (or divide) this range into a number of smaller sub-ranges, for example, sub-ranges such as 0-10, 10-20, 20-30, 30-40, 40-50, 50-60, 60-70, 70-80, 80-90, 90-100 (showing a split of the range into sub-ranges having the same amount of units). In such a split, the sub-ranges may be configured so that the sub-range value at the low end of each sub-range may not be inclusive. This means, using the example above, that a parameter to be analyzed having value of 10 may be placed into the 0-10 sub-range, not the 10-20 sub-range. Parameter values of X may be placed into the range of 10-20, for example, if X>10 and X<=20. For determining the beginning and ending of the sub-ranges, other methods of splitting the sub-ranges may also be use in an embodiment.

In another, further example, the initial range 0 to 100 may be split based on a value, such as RANGE_VARIANCE, which provides a variance in the size of the ranges, such as 20%. In such an example an initial range from 0 to 100 may be split into sub-ranges: (0-1), (1-2), (2-3), (3-4), (4-5), (5-6), (6-7), (7-9), (9-11), (11-14), (14-17), (17-21), (21-26), (26-33), (33-41), (41-51), (51-64), (64-80), (80-100). In this example, like the example above, the low values of the sub-ranges are again not inclusive (so a parameter value of 26 will fit into the range 21-26, not 26-33). Using a variance variable such as RANGE_VARIANCE, in determining sub-ranges may allow for sub-ranges that will be sized to match the range being split no matter what the initial starting range is (a minimum range size variable such as RANGE_MIN_DELTA, in this case 1, may also be used so that the sub-ranges may have a minimum size and may not get too small). However, in operation of an embodiment, sub-ranges may have any size or variance consistent with a dividing of an initial starting range.

As performance analyzer engine 210 receives data points and performs analysis, it may determine adjustments to the minimum and maximum control parameter setting values (providing new or updated control parameter settings 112), and determine that optimal (or near optimal) system performance can be identified to exist within a limited or narrow range of settings (e.g. within one or a small group of the sub-ranges) for the control parameter being regulated by system controller 108. So, beginning, for example, from an initial broad search range (containing multiple sub-ranges), new minimum and maximum control parameter setting values 112 (e.g. $N_{tran}$ Min/Max) may be narrowed over time as processing continues to one or a small set of sub-ranges. As analysis continues, the P values 106 (e.g. performance data) and the V values 114 (e.g. the number of active transactions ($N_{act}$) in the IAP system example) that are examined by performance analyzer engine 210 may be similarly restricted to those values which fit in the narrowing search range over time.

However, additionally, if the performance of the system undergoes a change over this time period (taking the performance out of the narrowed focused search range), it may be possible that a new point outside the current operating search range might yield better performance. To capture this data point (and move performance in the new direction), performance analyzer engine 210, in accordance with an embodiment, may occasionally relax the search range restriction or change it, looking, for example, past a determined optimal sub-range to test system performance in sub-ranges surrounding a current optimal sub-range. Performance analyzer engine 210 may relax (or widen) the search range (e.g. including or re-including sub-ranges) at a periodic interval having a fixed frequency, for example. The performance analyzer engine 210 can also change the periodic interval of relaxation, for example, lowering the frequency of relaxation if the performance data proves to be stable. In one example, the relaxation may occur at uniform intervals, but in other examples, non-uniform intervals instead of at intervals having periodicity may also be used.

One way to relax the control range restriction may be to perform the data analysis using or by maintaining a window defining or including a set of data points which allows the most recent data points to be analyzed, such as the most recent 10, 20, 30 . . . 100, etc. data points. As the data changes (with the window being maintained by moving data points into and out of the window), new search ranges may develop where performance analyzer engine 210 may gather new data and adjust for example the $N_{tran}$ Min/Max values 112 for system controller 108 in the IAP system example. When fewer data points are included in the window (for example by setting a variable such as MAX_DATA_POINTS to be a low number) the data available for analysis will rapidly change allowing for relaxation (or widening) of the search range with greater frequency. When a greater number of data points are included in the window (for example by setting the MAX_DATA_POINTS variable to be a high number) the data available for analysis will change less and the frequency for relaxing (or widening) the search range can also be less.

Even with the occasional relaxation (or changing) of the search range by performance analyzer engine 210 in the analysis for new or updated minimum and maximum control parameter setting values 112, it may be possible that V, P input 218 may not cover the full range of control achievable by system controller 108. As stated, when the search range narrows to a limited number of sub-ranges, the performance analyzer engine 210 will also limit the system controller 108 to control parameter setting values within these sub-ranges and the in-coming V and P values 114, 106 will also reflect performance readings from these limited sub-ranges.

In such instances, performance analyzer engine 210 may not receive data (i.e., the data stream of V, P values 218) from data collector 208 to yield control values that may be of interest. In the example of the IAP server system, for instance, performance analyzer engine 210 may seek to explore performance at a lower number of concurrent transactions, but the load on the system at the given time may be such that the number of transaction requests may constantly be pushing performance up against the maximum number of active transactions for the system.

In one embodiment, performance analyzer engine 210 may, in such circumstances, set the control parameter setting values for the minimum and/or maximum control values 112 (e.g. $N_{tran}$ Min or Max) that will force system controller 108 to gather data in a range for which performance analyzer engine 210 may be seeking performance data. Forcing here, as stated, includes the meaning of providing a control setting to system controller 108 to temporarily move the control parameter setting away from an optimal setting for performance and direct (or force) system controller 108 to operate at a setting that will allow performance analyzer engine 210 to gather performance data to test or evaluate another setting (or setting sub-range) for a best performance or optimality. The forced control parameter setting value (provided as a new or updated control parameter 112) may be determined, for example, by performance analyzer engine 210 by determining whether there is a need to obtain new data points based, for example on a criteria, such as a need criteria.

One criterion that may be used is historic data. For example, performance analyzer engine 210 may determine a need to gather additional data, after reviewing historic data for minimum/maximum throttle control settings (e.g. $N_{tran}$ Min/Max control settings), for example, from database 222 (which may be accessed by performance analyzer engine 210).

Another criterion that may be used may be based on a look-around when data has not been returned for a sub-range for a period of time. For example, the performance analyzer engine 210 may determine that there is a need to obtain a data point for a sub-range that is adjacent to a sub-range having a best performance value, where no data has been received for that adjacent sub-range for a period of time. In such a case the performance analyzer engine 210 may set the control parameter to a value to generate the data point for the adjacent sub-range. In this example, the period for waiting for a data point for the adjacent sub-range may be determined based on, for example, counting a number of data points received from a stream of data points and determining whether the total number data points received surpasses a threshold during which time a performance has not been determined for the adjacent sub-range.

In such examples, performance analyzer engine 210 may select a range which may not be represented by data currently so that performance data for a particular sub-range (or for a particular set of sub-ranges, e.g. representing control parameter setting values higher than or lower than a current best value) may be obtained and evaluated. Changes in performance behavior that can be identified by forcing data points to different sub-ranges may be caused by a number of factors, such as variation in the operating environment, data parameters, etc. For example, a system, like the IAP, may employ several processing units for processing transactions. If one of these processing units stops processing transactions (e.g. breaks or shuts down) or if additional processing units are added, then the number of concurrent transactions that the system can handle will change, and this may be reflected in a change in the performance. The peak performance, e.g. on occurrence of a breakdown, may shift to a different optimal number of concurrent transactions. The performance characteristics may also change if the type of transactions sent to the system changes. For example, if the average size of the transaction increases, then the ideal number of concurrent transactions the system can most efficiently handle may go down.

Figure 3A:
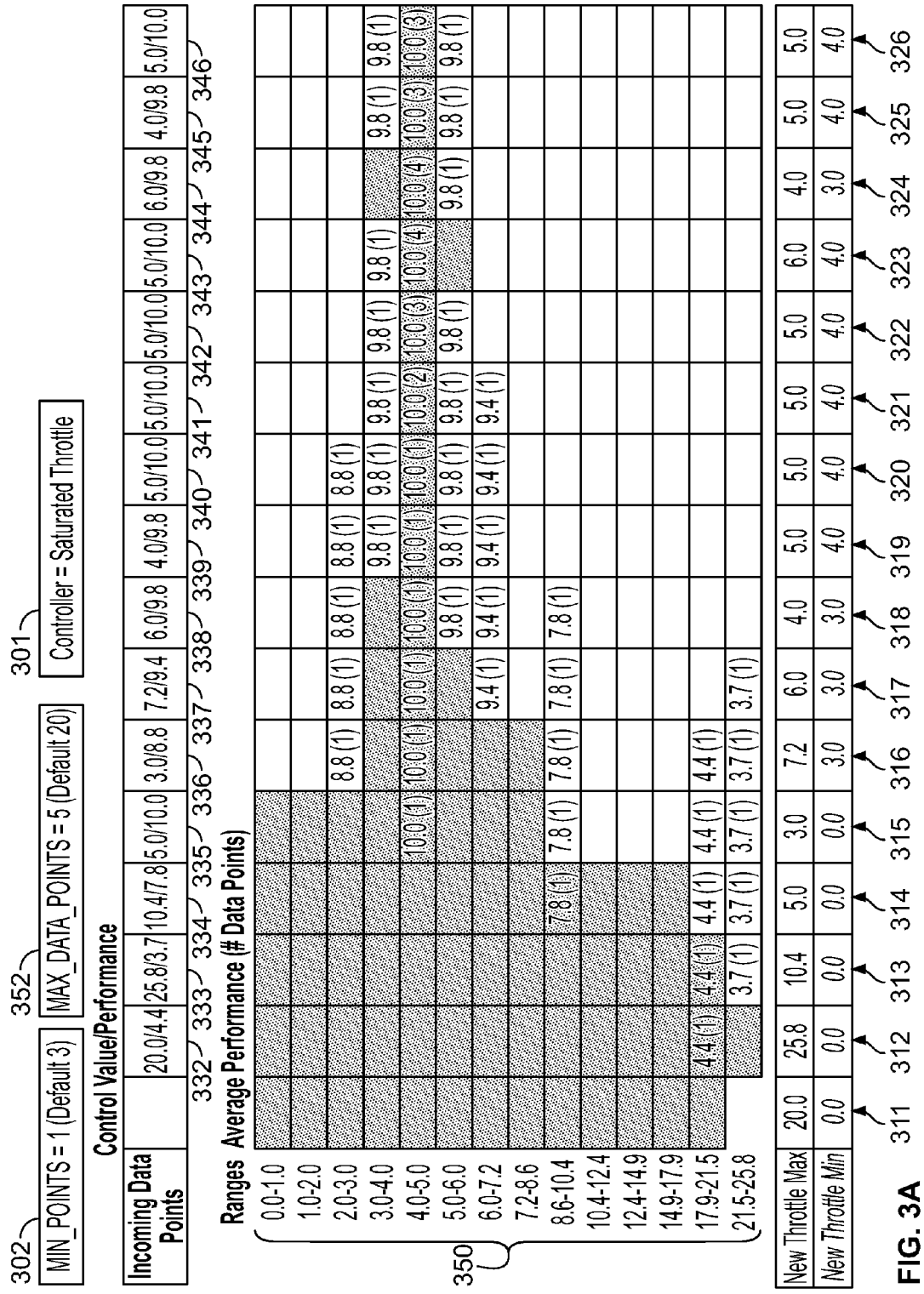
FIGS. 3A-B illustrate operation of a system in one embodiment.

Reference is now made to FIG. 3A, which illustrates operation of performance analyzer engine 210 in one embodiment. In this example, system controller 108 may be assumed to be a saturated throttle (as indicated in box 301), where system controller 108 may be controlling the maximum level of input into a system and the level of input going to system controller 108 is greater than what system controller 108 lets through to system 104. In such a case, the incoming data points may be used for analysis in obtaining the high range (max transaction value) allowed by system controller 108. However, in other examples, incoming data points may be set for any range allowed by system controller 108. In other examples, the analysis may set a minimum value (or to set both a minimum and maximum value). In this example, system 104 may be an IAP system and, the control variable and the measure of performance may be concurrent transactions and MB/s. However, other systems and performance measures can be used.

In operation, performance analyzer engine 210 may determine an initial search range based on an initial setting of the control range of system controller 108 (in this example a saturated throttle). The current control parameter setting 214 for system controller 108 may have been received, with a value of for example of 20.0 maximum concurrent transactions (averaged per period of performance, e.g. 1 second). The initial value received could have been any. In this example of a throttle (which only controls a maximum input), the minimum may be set to 0. The initial maximum and minimum control values may be used to set the initial search range. An initial search range can be set, for example, from 0.0 to 20.0.

Performance analyzer engine 210 may also split the initial search range into a number of smaller ranges (or sub-ranges). For example sub-ranges 350 show that the range (0.0-20.0) has been divided into smaller sub-ranges: (0.0-1.0), (1.0-2.0), (2.0-3.0), (3.0, 4.0), (5.0-6.0), (6.0-7.2), (7.2-8.6), (8.6-10.4), (10.4-12.4), (12.4-14.9), (14.9-17.9) and (17.9-21.5). In this example, the initial range has been split using a range variance value, so the sizes of the sub-ranges differ and grow progressively larger moving from 0 to 21.5. The top sub-range (17.9-21.5) may extend beyond the top of the initial search range (20.0) due to the way the sub-ranges may have been calculated (e.g. using a RANGE_VARIANCE value of 20%, starting from 0.0, and also using a range minimum size value, e.g., RANGE_MIN_DELTA, of 1). The low values of the sub-ranges in this example are not inclusive (so, for example, a data point having a system control parameter value of 7.2 will fit into the 6.0-7.2 sub-range, not the 7.2-8.6 sub-range).

From the created sub-ranges, performance analyzer engine 210 may also identify a top sub-range and a bottom sub-range. The top sub-range may be the sub-range having the highest range values. The bottom sub-range may be the sub-range having the lowest range values. In the example of the range split above, performance analyzer engine 210 may identify sub-range (17.9-21.5) as the top sub-range and sub-range (0.0-1.0) as the bottom sub-range.

With the initial range sub-divided, performance analyzer engine 210 may also set a search range that may include all of the sub-ranges of the initial range. For example, column 311 of FIG. 3A shows by the shaded blocks an initial search range set from 0.0 to 21.5. FIG. 3A, column 311 also shows an initial New_Throttle_Max value of 20.0 (being the initial setting of the system controller, which allows a maximum of 20.0 active, concurrent transactions in system 104 at any point of time) and an initial New_Throttle_Min value to be set to value 0.0 (representing zero active, concurrent transactions).

The initial search range for analysis taken from system controller 108 may be broad (where, e.g. New_Throttle_Min and New_Throttle_Max have a large, wider range) so that performance analyzer engine 210 may then, through processing, narrow this range down to a more focused optimal range, as shown in FIG. 3A. In other examples a narrow range or an intermediate-sized range may be initially set.

For new data points received by performance analyzer engine 210, (see, e.g. 218, FIG. 2, where data points may be provided by a function call such as, for example, submitDataPoint( )), performance analyzer engine 210 may add the data point received to storage associated with the appropriate sub-range, and may calculate a performance value for the sub-range. For example, performance analyzer engine 210 may calculate an average performance value for a sub-range, if performance analyzer engine 210 has collected a minimum number of data points for the sub-range.

In FIG. 3A, as depicted at box 302, a MIN_POINTS variable may be set to a value. In box 302, the value is shown to be 1 (which indicates for this example that performance analyzer engine 210 may calculate the performance average for the sub-range if there are one or more data points for the sub-range). However, in other examples the MIN_POINTS value may be larger than 1 and the value for MIN_POINTS (e.g. in box 302) may be based, in such other examples, on other criteria, such as for example, on a reasonable sample size of data points on which to base an average performance calculation. As shown also in FIG. 3A in box 302 a MIN_POINTS value of 3 (indicated as a default value) may be suitable for optimizing a throttle controlling an IAP system. A MIN_POINTS value of 3 for an IAP system may be desirable considering factors such as the frequency at which data points may be received by the performance analyzer engine and the consistency of the system's performance in optimization. Other values for MIN_POINTS may be suitable when optimizing other systems or other control parameters (e.g. apart from concurrent transactions). In considering factors for determining a MIN_POINTS value, low values for MIN_POINTS might be used in cases of consistent data. Higher values for MIN_POINTS might be used for more irregular performance data in order to average out anomalies.

Performance analyzer engine 210 may compare the calculated performances of the sub-ranges, using analysis logic, such as, for example, a hill-climbing algorithm, to step through the sub-ranges toward better performance by setting the minimum/maximum values (e.g. the $N_{tran}$ Min/Max values) for system controller 108 to move the control variable for analysis in determining new/desired target sub-ranges. Other analysis logic may also be used. Hill-climbing is a known mathematical optimization technique, which may seek to find a maximum or minimum for a target function, e.g. f(x), where x represents, for example, a vector of continuous and/or discrete values. A hill-climbing algorithm may attempt to find maximum or minimum solution values by incrementally changing a single element of the function, taking steps towards higher and higher (or lower and lower) performance points until the algorithm cannot determine any higher (or lower) solution points. A general hill-climbing algorithm may typically stop when no further improvement can be made, at which point the algorithm may have found the true maximum or a local maximum.

In one embodiment, a hill-climbing algorithm may be implemented, where the hill-climbing algorithm may not invoke any specific procedure to avoid local maxima. In one example, the performance analyzer engine 210 may continue to monitor the performance of system 104, even after finding a maximum (either a local or true maximum) and, occasionally look around the surrounding ranges to verify that the system is at a maximum. A performance curve generally may not have multiple maximas, except due to performance data irregularities that may eventually average out if enough data is analyzed. In such circumstances, a hill climbing algorithm with no specific procedure to avoid local maxima may be suitable. In other situations where the performance curve would have multiple maximas, a hill-climbing algorithm that includes local maxima checking may be used.

As shown in FIG. 3A, performance analyzer engine 210 may apply analysis logic, such as a hill-climbing algorithm, and the analysis logic may allow performance analyzer engine 210 to take large steps in moving the minimum/maximum values (e.g. the $N_{tran}$ Max/Min ranges) for system controller 108 in the beginning of the analysis (when the search range is larger), and allow performance analyzer engine 210 to take smaller steps in moving the minimum/maximum values as the search range gets smaller (in such an implementation the hill-climbing algorithm may be configured to operate like a binary search algorithm). Over time, performance analyzer engine 210 may narrow the search range down to a single sub-range which gives an optimal performance.

In example operation as shown by FIG. 3A, after the initial search is set performance analyzer engine 210 may receive data point 332 with values of 20.0/4.4, indicating that for 20.0 concurrent transactions, there is a performance output of 4.4 MB/sec in data through-put. As the V value 20.0 corresponds to the sub-range 17.9-21.5, the performance (P) value of 4.4 may be stored and/or associated with the 17.9-21.5 sub-range (e.g. as 4.4 (1), first instance, is shown in column 312 in the 17.9-21.5 sub-range). In executing the analysis logic (e.g. the hill-climbing algorithm), performance analyzer engine 210 may determine a new search range, based on the new data input.

As the performance value of 4.4 MB/sec in column 312 is the current best performance value, and as the 4.4 MB/sec performance value is currently stored (located) in the current top existing sub-range (the 17.9-21.5 sub-range), performance analyzer engine 210 may create a new sub-range (21.5-25.8) to identify that newly created sub-range as the new top sub-range. The performance analyzer engine 210 may then expand the search range in this instance to include the adjacent, higher-valued sub-range of 21.5-25.8. Thus, as indicated by the shaded boxes in column 312, performance analyzer engine 210 may determine a new search range from 0.0-25.8, allowing sub-range 21.5-25.8 to be created and included in the search range (with the creation indicated by the new block added for sub-range 21.5-25.8 in column 312). This new block is shaded, because it is now included in the search range.

With the search range expanded to include the new range of 21.5-25.8, performance analyzer may also set a New_Throttle_Max value to 25.8, so that performance in this newly added sub-range can be explored. In the example of the throttle, where system controller 108 controls only a maximum transaction setting, performance analyzer engine 210 may send only the New Throttle Max value setting to system controller 108 (a setting to allow up to 25.8 active, concurrent transactions to be incoming to system 104 from system controller 108).

In other examples, performance analyzer engine 210 may send both the New_Throttle_Max and New_Throttle_Min values. By sending the New_Throttle_Max value set at 25.8 (in column 312) to system controller 108, performance data for system 104 may be gathered for concurrent transaction settings up to 25.8 active transactions.

Data point 333, with additional V, P values 25.8/3.7, may next arrive, indicating that for 25.8 concurrent transactions, there is a performance output of 3.7 MB/sec. This new performance value of 3.7 MB/sec for the higher throttle control setting of 25.8 concurrent transactions is lower than the 4.4 performance output value for 20.0 concurrent transactions). The 3.7 performance value may be stored in memory or otherwise associated with the corresponding 21.5-25.8 sub-range (as 3.7(1), first instance, is shown in column 313 in the 21.5-25.8 sub-range). In this instance, the top sub-range is found to not have the best performance value.

In analysis, based on the additional data of the 3.7 MB/sec performance value being added to the 21.5-25.8 sub-range, performance analyzer engine 210, e.g. executing a hill-climbing algorithm, may set the search range to be from 0.0 to 21.5 (as indicated by the shaded boxes in column 313, where the search range includes the best performance that has been found so far—4.4 MB/sec at 20.0 concurrent transactions (in the 17.9-21.5 sub-range) and surrounding sub-ranges where performance for those sub-ranges is null (e.g. the sub-ranges from 0.0 to 17.9. The 21.5-25.6 sub-range may remain identified as the top sub-range (highest sub-range), but the 21.5-25.6 sub-range may be removed from the active search range (which is shown by the grey blocks now in column 313). However, to explore sub-ranges below the 17.9-21.5 sub-range (or representing control parameter values less than 17.9) performance analyzer engine 210 may set or force (as shown in column 313) the New_Throttle_Max value to be 10.4—a lower value roughly halving the 0.0-21.5 search range.

Performance analyzer engine 210 may determine the need to explore sub-ranges below (or representing system controller settings less than) 17.9, because the data at the sub-range 17.9 (for column 313) shows a 4.4 performance value for the 17.9-21.5 sub-range which is greater than the 3.7 performance value for the 21.5-25.8 sub-range. So, in analysis performance analyzer engine 210 may determine a need to explore the sub-ranges below (or representing system controller settings less than) 17.9 (e.g. the unexplored sub-ranges (0.0-1.0), (1.0-2.0), (2.0-3.0), (3.0-4.0), (4.0-5.0), (5.0-6.0), (6.0-7.2), (7.2-8.6), (8.6-10.4), (10.4-12.4), (12.4-14.9) and (14.9-17.9)). To make this exploration, performance analyzer engine 210 may set the New_Throttle_Max value to be 10.4—to force system controller 108 to obtain data points that can be applied to the sub-range of 8.6-10.4 and lower (e.g. providing control settings to system controller 108 to move control parameters away from the best setting of 4.4, at the 17.9 sub-range, and allowing performance analyzer engine 210 to gather performance data to test or evaluate a lower-valued sub-range for best performance or optimality).

New performance data may be received at data point 334 (based on the previous $N_{tran}$ Max setting at 10.4). Data point 334 shows that for a lower number of concurrent transactions (e.g. 10.4) there is a higher performance of 7.8 MB/sec. The performance data, 7.8 MB/sec, may be stored for the sub-range 8.6-10.4 (as 7.8(1), first instance, is shown in column 314). In this example, the low values of the sub-ranges are not inclusive (so the 7.8 MB/sec reading for 10.4 concurrent transactions may be placed into the 8.6-10.4 sub-range, not the 10.4-12.4 sub-range).

In response to this additional data, performance analyzer engine 210 may then set a new search range from 0 to 17.9 (as indicated by the shaded blocks in column 314). This new search range incorporates the new highest or best 7.8 performance value at sub-range 8.6-10.4 and also includes other unexplored surrounding sub-ranges below (lower in value than) or above (higher in value than) the 8.6-10.4 sub-range, where those sub-ranges have no calculated performance value. Surrounding here includes all sub-ranges having no calculated performance value that are adjacent to each other radiating out, seen in FIG. 3A as either above (representing system controller settings less than) the sub-range having the best performance value or as seen in FIG. 3A as below (representing system controller settings greater than) the sub-range having the best performance value (e.g. before a single optimum sub-range has been found). Thus, in column 314 surrounding includes all adjacent, sub-ranges above (e.g. sub-ranges (10.4-12.4), (12.4-14.9), (14.9-17.9) and below (e.g. sub-ranges (0.0-1.0), (1.0-2.0), (2.0-3.0), (3.0-4.0), (4.0-5.0), (5.0-6.0), (6.0-7.2), (7.2-8.6) the sub-range having the best performance value (e.g. sub-range 8.6-10.4), where those sub-ranges have not been explored.

In column 314, the 17.9-21.5 and 21.5-25.8 sub-ranges have been removed from the current search range (Sub-ranges 21.5-25.8 and 0.0-1.0 may remain identified as the top and bottom sub-ranges, respectively). As compared to the search range in column 313, the search in column 314 has been narrowed to remove sub-range 17.9-21.5, which contains the performance value of 4.4 MB/sec (the previous best performance value). In response to this finding of a higher performance value (7.8 MB/sec) at a lower control value setting (e.g. 8.6-10.4 concurrent transactions), performance engine 210 may further seek to gather performance data for throttle control settings at the lower sub-ranges (e.g. (0.0-1.0), (1.0-2.0), (2.0-3.0), (3.0-4.0), (4.0-5.0), (5.0-6.0), (6.0-7.2), (7.2-8.6)).

In continuing the search for data point values for the sub-ranges below (or representing system controller settings less than) the 8.6-10.4 sub-range, performance analyzer engine 210 in column 314 may also set New_Throttle_Max to be 5.0—a lower value (e.g. based on the analysis that the 7.8 MB/sec performance value for the 8.6-10.4 sub-range is higher than the 4.4 and 3.7 MB/sec performance values for the 17.9-21.5 and 21.5-25.8 sub-ranges). The New_Throttle_Max setting at 5.0 forces (or directs) system controller 108 to obtain data points at the sub-range of 4.0-5.0 or lower. Where in this example the sub-ranges are not inclusive on the low end, the value of 5.0 will fit in the 4.0-5.0 sub-range, not the 5.0-6.0 sub-range. A New_Throttle_Max value of 5.0, sets system controller 108 parameter values so that data points may be returned on performance at parameter settings from within the (0.0-1.0), (1.0-2.0), (2.0-3.0), (3.0-4.0), (4.0-5.0) sub-ranges.

Based on the New_Throttle_Max value set at 5.0, new data is received at data point 335, which indicates that for 5.0 concurrent transactions there is a through-put performance of 10.0 (a higher value than the previous 7.8). The 10.0 MB/sec performance value may be stored in or otherwise associated with the 4.0-5.0 sub-range (as 10.0(1), first instance, is shown in column 315). In response to this additional data, performance analyzer engine 210 may then set (as shown in column 315) a new search range from 0 to 8.6 (as indicated by the shaded blocks in column 315) that includes the sub-range 4.0-5.0 (which contains the current best performance value) and other surrounding, unexplored sub-ranges (e.g. sub-ranges 0.0-1.0, 1.0-2.0, 2.0-3.0, 3.0-4.0 and 5.0,-6.0, 6.0-7.2, 7.2-8.6). As compared to the search range in column 314, the search range in column 315 has been narrowed to remove sub-range 8.6-10.4, which contains the performance value of 7.8 MB/sec (the previous best performance value), and also the sub-ranges (10.4-12.4), (12.4-14.9) and (14.9-17.9), past or above the explored 8.6-10.0 sub-range. Since sub-range 8.6-10.0 has been explored sub-ranges (10.4-12.4), (12.4-14.9) and (14.9-17.9) may not be included in the search range as unexplored sub-ranges surrounding the sub-range with the best performance value. Also, while the search has narrowed, sub-ranges 21.5-25.8 and 0.0-1.0 may remain identified as top and bottom sub-ranges in column 315.

For further searching in the lower-valued sub-ranges (e.g. sub-ranges (0.0-1.0), (1.0-2.0), (2.0-3.0), (3.0-4.0) performance analyzer engine 210 may also set the New_Throttle_Max value to be 3.0—a lower value from the previous 5.0 value (e.g. based on the analysis that where the 10.0 MB/sec performance value at the 4.0-5.0 sub-range provided again an improvement, possibly higher system performance could be found at an even lower-valued sub-range). In the example of FIG. 3A, performance analyzer engine 210 may then continue to explore sub-ranges below (representing system controller settings less than) the 3.0-4.0 sub-range to find higher performance. The New_Throttle_Max setting of 3.0 in column 315 forces (or directs) system controller 108 to obtain data points at the sub-range of 2.0-3.0 or lower.

Data point 336 returns V, P values indicating that for 3.0 concurrent transactions (V) there is a performance throughput of 8.8 MB/sec (P). This is a lower performance than the 10.0 MB/sec received from the previous data point (see the 10.0 value for the 4.0-5.0 sub-range in column 315). Performance analyzer engine 210 may store or otherwise associate the 8.8 MB/sec performance value with the 2.0-3.0 sub-range.

In response to this additional data, performance analyzer engine 210 may then set (as shown in column 316) a new search range from 3.0 to 8.6 (as indicated by the shaded blocks in column 316) that includes the sub-range 4.0-5.0 (which contains the current best performance value) and other surrounding, unexplored sub-ranges (e.g. sub-ranges 3.0-4.0 and 5.0,-6.0, 6.0-7.2, 7.2-8.6). As compared to the search range in column 315, the search range in column 316 has been narrowed to remove sub-ranges (0.0-1.0), (1.0-2.0), which are sub-ranges with lower values than the explored sub-range at 2.0-3.0 In this example, sub-ranges (0.0-1.0), (1.0-2.0) would not be unexplored sub-ranges that surround the sub-range having the best performance value. Where the 8.8 MB/sec performance value was found at 2.0-3.0 and there is higher performance, 10.0 MB/sec, at 4.0-5.0, in this example the sub-ranges (0.0-1.0), (1.0-2.0) lower than 2.0-3.0 may be discarded (sub-ranges 21.5-25.8 and 0.0-1.0 remain identified as the top and bottom sub-ranges, respectively).

Based on this additional data, performance analyzer engine 210 may direct the search to move toward higher-valued sub-ranges again, setting (as shown in column 316) a new search range from 3.0 to 8.6 (as indicated by the shaded blocks in column 316). Performance analyzer engine 210 may also (as indicated in column 316) set the New_Throttle_Max value to be 7.2 (a higher value from the previous 3.0 value) and further set an additional New_Throttle_Min value to be 3.0. The setting of New_Throttle_Min and New_Throttle_Max to be between the sub-ranges from 3.0 and 7.2 in column 316 shows a narrowing of the search range for the possible optimal value (e.g. in contrast with the initial search range of 0 to 21.5).

Column 317 shows a further narrowing of the optimal value range. In FIG. 3A, additional data point 337 arrives; indicating that for 7.2 concurrent transactions there is a performance through-put of 9.4 MB/sec. Because in this example, the low values of the sub-ranges are not inclusive, the 9.4 MB/sec reading for 7.2 concurrent transactions may be placed into the 6.0-7.2 sub-range, not the 7.2-8.6 sub-range. The 9.4 performance value for 7.2 concurrent transactions is lower than the 10.0 performance value previously captured for 5.0 concurrent transactions. Accordingly, performance analyzer engine 210 may further narrow the search range to 3.0-6.0 (as indicated by the shaded blocks in column 317), where the sub-range 4.0-5.0 (which contains the current best performance value) is included along with surrounding, unexplored sub-ranges 3.0-4.0 and 5.0,-6.0 (sub-ranges 21.5-25.8 and 0.0-1.0 may remain identified as the top and bottom sub-ranges). As compared to the search range in column 316, the search range in column 317 has been narrowed to remove sub-range 6.0-7.2, which contains the performance value of 9.4 MB/sec (the just found performance value, which is not the best performance value), and also the sub-range (7.2-8.6) past or above the explored 6.0-7.2 sub-range. Since the performance value (9.4 MB/sec) for the sub-range 6.0-7.2 is lower than the 10.0 MB/sec value at 4.0-5.0, the sub-ranges 6.0-7.2 and 7.2-8.6 may not be included in the search range. In this example sub-range 6.0-7.2 has been explored and sub-range 7.2-8.6 is not a sub-range surrounding the sub-range with the best performance value.

Performance analyzer engine 210, may further set New_Throttle_Max and New_Throttle_Min values to be 6.0 and 3.0, respectively (also shown in column 317) to perform additional searching. It is noted also in column 317 that the window of data points for analysis has changed. As shown in box 352, a value such as MAX_DATA_POINTS allows five (5) data points, in this example, to be included for analysis. To follow this restriction performance analyzer engine 210, in one example, may allow only the most recent 5 data points to be analyzed (using a first-in-first-out scheme for point deletion). In column 317, the addition of the 9.4 MB/sec performance value in the 6.0-7.2 sub-range, has caused performance analyzer engine 210 to remove from the analysis the earliest received point, the 4.4 value, previously stored in the 17.9-21.5 sub-range.

Looking now at column 318, additional data point 338 now arrives; showing, for example, that for 6.0 concurrent transactions there is through-put performance of 9.8 MB/sec. In this example, the low values of the sub-ranges are not inclusive (so the 9.8 MB/sec reading for 6.0 concurrent transactions may be placed into the 5.0-6.0 sub-range, not the 6.0-7.2 sub-range). Based on this data, performance analyzer engine 210 may further narrow the search range (to 3.0-5.0, as indicated by the shaded blocks in column 318) and set New_Throttle_Max and New_Throttle_Min values (which are further narrowed to 4.0 and 3.0, respectively). It is noted that the 4.0 and 3.0 throttle values over-shoot the previous 10.0 performance value (found in sub-range 4.0-5.0), but at this point performance analyzer engine 210 may be operating, for example, to gather data (or force a setting to gather data for) for the specific sub-range of 3.0-4.0 to test whether a value for performance within the 3.0-4.0 sub-range could provide a higher through-put than 10.0 MB/sec.

In column 318, the addition of the 9.8 MB/sec performance value in the 5.0-6.0 sub-range has also caused performance analyzer engine 210 to remove the 3.7 MB/sec performance value, previously stored in the 21.5-25.8 sub-range. This removal follows the FIFO removal of data points and maintains the number of data points for analysis at MAX-DATAPONTS.

Performance analyzer engine was testing in this example at column 318 whether performance within the 3.0-4.0 sub-range could provide a higher through-put than 10.0 MB/sec, in the example of FIG. 3A at column 318. However in column 319 it can be seen that the 3.0-4.0 sub-range does not provide a higher value. In column 319, data point 339 arrives; indicating that for 4.0 concurrent transactions there is a processing through-put of 9.8 MB/sec. Again, the low values of the sub-ranges are non-inclusive, so the 4.0 concurrent transaction value fits into the 3.0-4.0 sub-range, not the 4.0-5.0 sub-range. The through-put value of 9.8 MB/sec for the 3.0-4.0 sub-range is lower than the 10.0 MB/sec performance found for the 4.0-5.0 sub-range. Based on data point 339, performance analyzer engine 210 may set the search range to 4.0-5.0 (as indicated by the shaded block in column 319) and set New_Throttle_Max and New_Throttle_Min values to 5.0 and 4.0, respectively (also indicated in column 319). At this point, performance analyzer engine 210 has identified a sub-range (between 4.0 and 5.0 concurrent transactions) providing an optimal performance (10.0 MB/sec through-put).

In column 319, it is also noted that the addition of the 9.8 MB/sec performance value in the 3.0-4.0 sub-range has also caused performance analyzer engine 210 to remove the 7.8 MB/sec performance value, previously stored in the 8.6-10.4 sub-range (follows the FIFO removal scheme to maintain the number of data points for analysis at MAXDATA_PONTS). At this juncture also, sub-ranges 21.5-25.8 and 0.0-1.0 remain identified as the top and bottom sub-ranges, respectively.

Additional data may confirm the settings. For example data points 340, 341 and 342, next arrive, each showing that at 5.0 concurrent transactions there is a performance value of 10.0 MB/sec (which is in line with optimal sub-range identified above). Accordingly, as shown in columns 320, 321 and 322, performance analyzer engine 210 may maintain the search range or window of 4.0-5.0 (just one sub-range) and maintain the New_Throttle_Max and New_Throttle_Min values at 5.0 and 4.0 respectively. This allows for optimized settings greater than 4.0 and less than or equal to 5.0, because in this example the lower value of the sub-ranges, as stated above, are non-inclusive. The addition of data points 340, 341, 342, may cause, however, the removal from analysis of older data points (e.g. (following the FIFO removal scheme to maintain the number of data points for analysis at MAX_DATA_PONTS). For example, column 322 shows that three data points having performance values of 10.0 MB/sec remain in the analysis where all are located in sub-range 4.0-5.0 (these are the most recent data points 340, 341 and 342). Additionally, a performance value of 9.8 (from data point 339) remains in sub-range 3.0-4.0 and a performance value of 9.8 (from data point 338) remains in sub-range 5.0-6.0. Sub-ranges 0.0-1.0 and 21.5.-25.8 may remain identified as top and bottom sub-ranges, respectively.

Columns 323 and 324 show the actions of performance analyzer engine 210 in expanding the search range, to obtain new test values and test new sub-ranges, for example, after an optimal sub-range has been found. When data point 343 arrives, it indicates that for 5.0 concurrent transactions a processing efficiency of 10.0 MB/sec is achieved. This is the same data that had been received also in data points 340, 341 and 342. However, in this instance performance analyzer engine 210 on receipt of this same data may now expand the search range from 4.0-5.0 to 4.0-6.0 (as indicated by the shaded blocks in column 323), for example, based on a search window of points which has removed the 9.8 data point for the 5.0-6.0 sub-range (following the FIFO removal scheme to maintain the number of data points for analysis at MAX_DATA_PONTS).

Where the removal of the 9.8 data point for the 5.0-6.0 sub-range causes the 5.0-6.0 sub-range to have no performance value for analysis (where now the performance value in the 5.0-6.0 sub-range has been set to null), and that sub-range is adjacent to (next to) the sub-range having the best performance value, performance analyzer engine 210 may expand the search range to include the higher-valued sub-range that is adjacent to the sub-range having the best performance. Hence, in this example, at column 323, performance analyzer engine 210 expands to search range from 4.0-5.0 to 4.0-6.0 (as indicated by the grey blocks in FIG. 3A). Performance analyzer engine 210 may further set the New_Throttle_Max and New_Throttle_Min values at 6.0 and 4.0 respectively (thereby, allowing data from an expanded search range to be captured).

When data point 344 arrives, its V, P values indicate that for 6.0 concurrent transactions (V) there is a performance value (P) of 9.8 MB/sec (which is lower than the 10.0 MB/sec value obtained for the 4.0-5.0 sub-range). The low value of the sub-ranges are non-inclusive in this example, so the 9.8 MB/sec reading for 6.0 concurrent transactions may be placed into the 5.0-6.0 sub-range, not the 6.0-7.0 sub-range. After this data is input, performance analyzer engine 210 may then move the search range from 4.0-6.0 to 3.0-5.0 (as indicated by the shaded blocks in column 324, based on the removal of point 9.8 from the 3.0-4.0 sub-range, which follows the FIFO data point removal order to maintain MAX_DATA_POINTS).

Where the removal of the 9.8 MB/sec performance value for the 3.0-4.0 sub-range causes the 3.0-4.0 sub-range to have no performance value for analysis (where now the performance value in the 3.0-4.0 sub-range has been set to null), and that sub-range is adjacent to the sub-range having the best performance value, performance analyzer engine 210 may expand the search range to include this lower-valued sub-range that is adjacent to the sub-range having the best performance. Hence, in this example, at column 324, performance analyzer engine 210 changes the search range from 3.0-5.0 to include the 3.0-4.0 sub-range (as indicated by the grey blocks in FIG. 3A).

Further, performance analyzer engine 210 may set New_Throttle_Max and New_Throttle_Min values at 4.0 and 3.0, respectively (also indicated in column 324). This throttle setting, again (like settings for New_Throttle_Max and New_Throttle_Min in column 418) over-shoots the 4.0-5.0 sub-range (which has the 10.0 MB/sec value), but it also allows (by determining a need to force (or obtain) data for this sub-range) for data from the 3.0-4.0 sub-range to be collected.

Data point 345 provides additional data, indicating that for 4.0 concurrent transactions there is a performance value of 9.8 MB/sec. As the low values of the sub-ranges are non-inclusive in this example, the 9.8 MB/sec reading for 4.0 concurrent transactions may be placed into the 3.0-4.0 sub-range, not the 4.0-5.0 sub-range. The performance value of 9.8 MB/sec for the 3.0-4.0 sub-range is lower than the 10.0 MB/sec performance value for the 4.0-5.0 sub-range. Based on this additional data, performance analyzer engine 210 may set the search range again back to 4.0-5.0 (as indicated from the shaded block in column 325) and set New_Throttle_Max and New_Throttle_Min values to 5.0 and 4.0 respectively (also indicated in column 325). Sub-ranges 21.5-25.8 and 0.0-1.0 remain identifies as the top and bottom ranges, respectively.

At this juncture, performance analyzer engine 210 has again identified a sub-range (4.0-5.0 concurrent transactions) for an optimal performance (10.0 MB/sec through-put). This allows for optimized settings between greater than 4.0 and less than or equal to 5.0 concurrent transactions in this example, where the lower values of the sub-ranges, as stated above, are non-inclusive.

When data point 346 arrives, additional data is received confirming that for 5.0 concurrent transactions there is a performance of 10.0 MB/sec data through-put. Accordingly, performance analyzer engine 210 may, in column 326 maintain search range or window and New_Throttle_Min/Max values at 4.0-5.0 (again, allowing optimized settings between greater than 4.0 and less than or equal to 5.0 concurrent transactions)

In the example shown in FIG. 3A, performance analyzer engine 210 may set the throttle Min/Max values to lower and lower levels until it find that it has overshot the peak performance (e.g. at columns 318 and 324), at which point performance analyzer engine 210 may ease the throttle settings until it may again overshoot the peak (for example using higher Min/Max values). As can be seen in general, for each step performance analyzer engine 210 takes, it reduces the search range until a single sub-range may be determined (see, e.g. columns 319-322 and 325-326—locating an optimal performance value in the sub-range of 4.0-5.0 concurrent transactions).

Performance data may continue to be fed to performance analyzer engine 210, even after the optimal sub-range is reached. As stated above, as new data points arrive, the older data points may be discarded. The discarding may be accomplished, for example, by maintaining a window of data points for analysis that limits the number of data points performance analyzer engine 210 may keep in memory (or otherwise keep for processing). The number of points may be set by a value such as MAX_DATA_POINTS, as shown in FIG. 3A at box 352. In the example of FIG. 3A, MAX_DATA_POINTS is set to 5 points, for simplicity. In one example of operation with an IAP system, a MAX_DATA_POINTS value of 20 may be used where points data points are received every three minutes to maintain an hour of historical performance data for analysis in the performance analyzer engine (20 points*3 min/point=60 minutes (or 1 hour)). Where, for example, the timing of data point receipt is different, or where data points for a greater or lesser length of time are desired, other choices for MAX_DATA_POINTS may be made.

When data points are discarded, and there is no longer a minimum number of points for a given sub-range (e.g. where the number of current, non-discarded data points for the sub-range is less than the MIN_POINTS value), then the average performance for that sub-range may set back to null (or no value). When this happens to one of the sub-ranges adjacent to the sub-range having the current best (e.g. highest) determined performance value (e.g. the sub-range having the best performance—that identifies a best performance for the system), the search range may be expanded to again include the adjacent sub-range whose average performance has been re-set to null. In the example presented, once an optimum sub-range has been found, only adjacent sub-ranges may be included to expand the search range. for example in column 323, when the 5.0-6.0 value is set to null, and the 9.8 MB/sec performance value is removed, only the 5.0-6.0 sub-range is added-again to the search range, not the other (surrounding) higher-valued sub-ranges of (6.0-7.2), (7.2-8.6), (8.6-10.4) (10.4-12.4), (12.4-14.9), (14.9-17.9), (17.9-21.5), (21.5-25.8). Although just the adjacent sub-range is included after an optimum sub-range is found in other examples more surrounding sub-ranges beyond the most adjacent may be re-included into the search range. This action of creating a moving window of points for analysis, for example where the oldest points are removed on a first-in-first-out (FIFO) basis, may cause the performance analyzer to periodically check the sub-ranges adjacent to (and surrounding) the sub-range having the best performance to make sure that sub-range identified as the sub-range having the best performance is still best. Other triggers for checking sub-ranges may also be employed.

This removal of data points when the window moves beyond them can be seen in FIG. 3A. At all times (in each column) performance analyzer engine 210 analyzes up to only five data points. For example, column 322 shows five data point values, where three of the data point values are 10.0 (for the 4.0-5.0 sub-range), one value is 9.8 (for the 3.0-4.0 sub-range) and one value is 9.8 for the 5.0-6.0 sub-range. With data point 343, a new performance value (10.0) arrives for the 4.0-5.0 sub-range, the 9.8 value for the 5.0-6.0 sub-range (the oldest data point) may be removed (as is shown in column 323). Based on the removal of the 9.8 value from the 5.0-6.0 sub-range in column 323, performance analyzer engine 210 may then expand the search range from 4.0-5.0 to 4.0-6.0 (as indicated by the shaded blocks in column 323— including sub-range 5.0-6.0 which is adjacent to the sub-range having the best performance, sub-range 4.0-5.0).

Subsequently, in column 324, when an additional 9.8 performance value arrives for (and is associated with) the 5.0-6.0 sub-range (at 344), the arrival in this example causes a removal of the 9.8 performance value from the 3.0-4.0 sub-range (as is shown in column 324). Based on that removal, performance analyzer engine 210 may then move the search range from 4.0-6.0 to 3.0-5.0 (as indicated by the shaded blocks in column 324 now including sub-range 3.0-4.0 which in this case is again adjacent to the sub-range having the best performance, sub-range 4.0-5.0). One possible benefit of a performance analyzer engine 210, which operates by performing analysis on a moving window of data points limited in number, is that processing code may require very little memory as compared, for example, with a system that may perform analysis using every collected data point.

The process of checking sub-ranges adjacent to the sub-range having the best performance value may continue and may allow the location of the sub-range having the best performance to change as new system characteristics develop.

Figure 3B:
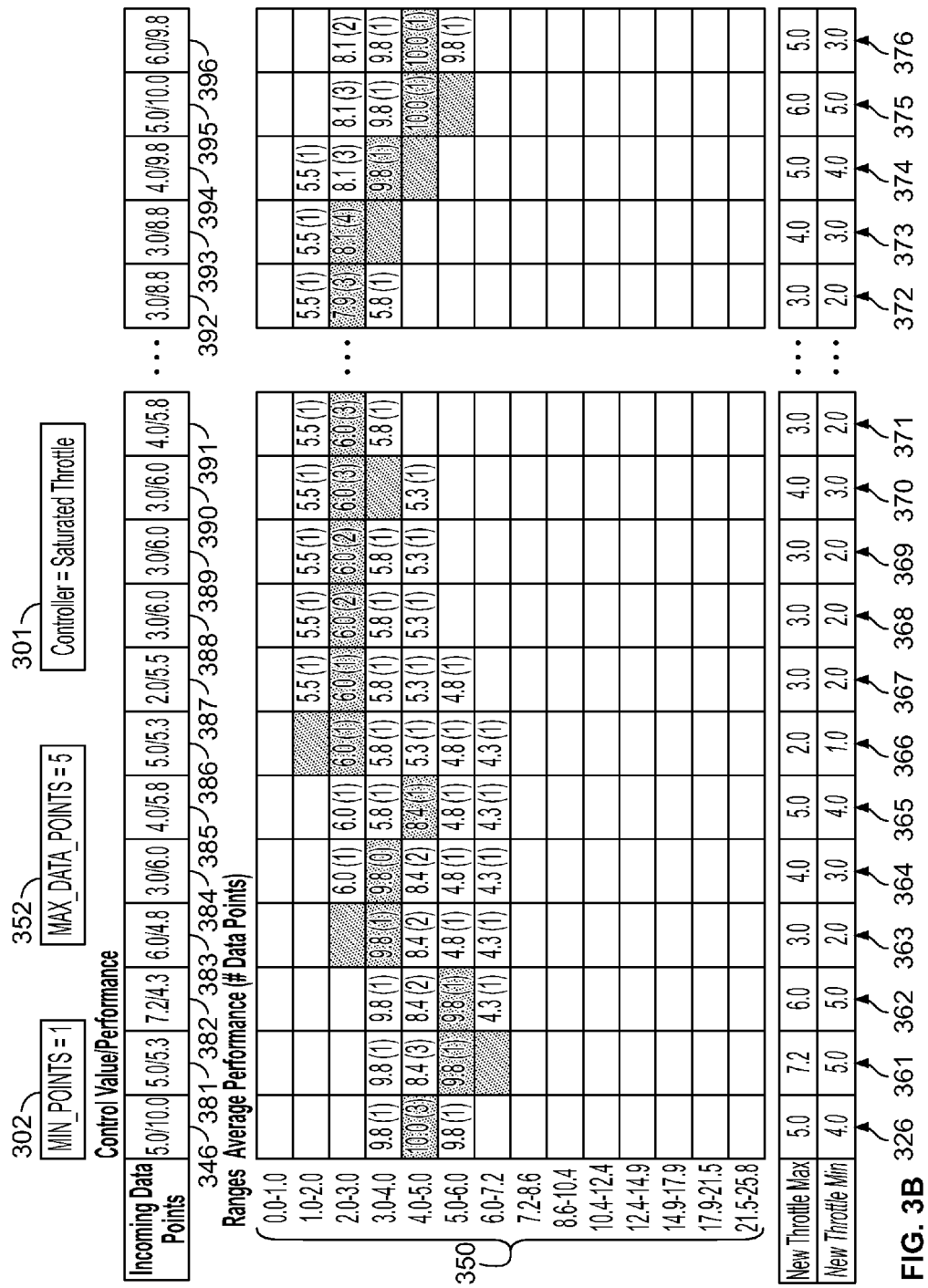

Reference is now made to FIG. 3B, which illustrates operation of a system in one embodiment when performance characteristics change. FIG. 3B shows column 326 from FIG. 3A, and then columns 361-376, which reflect adaptations that may be made by performance analyzer engine 210 as system characteristics change, as shown by incoming data points 381-396.

For example, whereas data point 346 shows that for 5.0 concurrent transactions there is a performance of 10.0 MB/sec data through-put, suddenly, data point 381 (the very next data point received) shows that for 5.0 concurrent transactions there is a performance of 5.3 MB/sec data through-put. Between data points 345 and 381 there is a performance drop of 4.7 MB/sec.

A sudden drop in performance may occur due a change in the configuration of system 104. For example, a set of resources for system 104 may become unavailable to process transactions, thus reducing the optimal number of transactions that system 104 can handle concurrently. In such a case, as shown by data points 346 and 381 new data may change the sub-range having the best performance due to the change in the performance of system 104.

When the new performance value (5.3 MB/sec) from data point 381 gets averaged with other performance data previously collected for the 4.0-5.0 sub-range, the average performance value produced is 8.4 MB/sec (i.e. (10.0+10.0+5.3)/3=8.4 MB/sec), a value that is now lower than some of the other sub-ranges that have performance values. In column 361, sub-range 5.0-6.0, having a performance value of 9.8 MB/sec, for example, may now become the best sub-range. As sub-range 6.0-7.2 contains no performance value (e.g. has a performance value set to null) and sub-range 6.0-7.2 is adjacent to the 5.0-6.0 sub-range having the best performance value, performance analyzer engine 210 may expand the search range to include sub-range 6.0-7.2 (as shown in column 361). Performance analyzer engine 210 may further set a New_Throttle_Max value to 7.2 to gather data for the 6.0-7.2 sub-range.

At column 362, data point 382 arrives showing that for 7.2 concurrent transactions there is a performance of 4.3 MB/sec data through-put. The 4.3 MB/sec value is stored (or associated) with the 6.0-7.2 sub-range (as shown in the shaded boxes in column 362) and New_Throttle_Max and New_Throttle_Min values are set to 6.0, 5.0, indicating a new optimum sub-range at 5.0-6.0 (as shown by the single shaded box).

Thereafter, data point 383 arrives showing that for 6.0 concurrent transactions there is a performance of 4.8 MB/sec data through-put. The 4.3 MB/sec value may be stored (or associated) with the 5.0-6.0 sub-range, and also in this case, the 9.8 MB/sec value that was previously stored with the 5.0-6.0 sub-range has now expired (where performance analyzer engine 210 maintains a window of points that following a FIFO point removal scheme). In column 363, sub-range 3.0-4.0 now has the best performance value (9.8 MB/sec). As sub-range 2.0-3.0 contains no performance value in column 363 (e.g. has a performance value set to null) and sub-range 2.0-3.0 is adjacent to the 3.0-4.0 sub-range, having the best performance value, performance analyzer engine 210 may expand the search range to include sub-range 2.0-3.0 (as shown by the shaded boxes in column 363). Performance analyzer engine 210 may further set New_Throttle_Max and New_Throttle_Min values to 3.0 and 2.0, respectively, to gather data for the 6.0-7.2 sub-range.

In column 364, data point 384 arrives showing that for 3.0 concurrent transactions there is a performance of 6.0 MB/sec data through-put. The 6.0 MB/sec value may be stored (or associated) with the 2.0-3.0 sub-range. However, in column 364 the addition of the 6.0 MB/sec may cause performance analyzer to remove the 9.8 MB/sec value at the 3.0-4.0 sub-range. In this case as 9.8 MB/sec was the best performance value, performance analyzer engine 210 may keep the 3.0-4.0 sub-range as the sub-range having the best performance value (e.g. showing a value 9.8 (0) (for zero instances) in column 364. The performance analyzer engine 210 may not reset the performance to null for a sub-range with less data points than MIN_POINTS if that sub-range is currently the sub-range with the best performance. And with the New_Throttle_Max and New_Throttle_Min values set at 3.0-4.0, performance analyzer engine 210 may set system controller 108 to gather data for the 3.0-4.0 sub-range.

When performance analyzer engine 210 receives data point 385, the data values show that for 4.0 concurrent transactions there is a performance of 5.8 MB/sec data through-put. Now sub-range 3.0-4.0 is no longer the sub-range with the best performance value. Sub-range 4.0-5.0 becomes the sub-range that has the best performance value (e.g. 8.4 MB/sec). Performance analyzer engine 210 sets the New_Throttle_Max and New_Throttle_Min values to be 5.0 and 4.0 respectively allowing system controller 108 to gather data for the 5.0-6.0 sub-range.

When data point 386 arrives, the data values show that for 5.0 concurrent transactions there is a performance of 5.3 MB/sec data through-put. As the 5.3 MB/sec performance value arrives for the 4.0-5.0 sub-range, the 8.4 MB/sec value at the 4.0-5.0 sub-range also expires, and thus 5.3 MB/sec becomes the performance value for the 4.0-5.0 sub-range. With the 8.4 MB/sec value removed, in column 366, the 6.0 MB/sec value in the 2.0-3.0 sub-range becomes the best performance value. As the sub-range 1.0-2.0 contains no performance value (e.g. has a performance value set to null) and sub-range 1.0-2.0 is adjacent to the 2.0-3.0 sub-range, now having the best performance value, performance analyzer engine 210 may expand the search range to include sub-range 1.0-2.0 (as shown by the shaded boxes in column 366). Performance analyzer engine 210 may further set New_Throttle_Max and New_Throttle_Min values to 2.0 and 1.0, respectively, to gather data for the 1.0-2.0 sub-range.

In column 367, data point 387 arrives having values showing that for 2.0 concurrent transactions there is a performance of 5.5 MB/sec data through-put. Sub-range 2.0-3.0, having the performance value of 6.0 MB/sec, is the sub-range with the best performance value. As data points 388 389, 390 next arrive, those points also confirm that sub-range 3.0-4.0 has the best performance value (of 6.0 MB/sec) as shown in columns 368, 369, 370. In column 370, in particular, the arrival of data point 390 (and the adding of the 6.0 MB/sec value for the 2.0-3.0 sub-range may cause the removal of the 5.8 MB/sec value for the 3.0-4.0 (as performance analyzer engine maintains a FIFO removal order for the window of points). As the sub-range 3.0-4.0 contains no performance value (e.g. has a performance value set to null) and sub-range 3.0-4.0 is adjacent to the 2.0-3.0 sub-range, now having the best performance value, performance analyzer engine 210 may expand the search range to include sub-range 3.0-4.0 in column 370.

Performance analyzer engine 210 may further set New_Throttle_Max and New_Throttle_Min values to 4.0 and 3.0, respectively, to gather data for the 3.0-4.0 sub-range. When data point 391 arrives it shows that for 4.0 concurrent transactions there is a performance of 5.8 MB/sec data through-put. The 5.8 MB/sec value may be stored in (associated with) the 3.0-4.0 sub-range. As shown in column 371, sub-range 2.0-3.0 may be found as an optimum sub-range at this time with an average performance value of 6.0 MB/sec. In column 371, the arrival of data point 391 also may cause the removal of the 5.3 MB/sec performance value that was in the 4.0-5.0 sub-range.

Processing may continue in this manner. At column 372, the system analysis shows that sub-range 2.0-3.0 has continued to be an optimum sub-range. In column 372, however, the average performance value of sub-range 2.0-3.0 has increased from 6.0 MB/sec to 7.9 MB/sec. The arrival of data point 392 shows that for 3.0 concurrent transactions there is a performance of 8.8 MB/sec data through-put. That is an increase over previous values of 6.0 MB/sec received at data points 389, 390, for example. This increase may be attributed to new components within system 104 coming on-line, and from this point performance analyzer engine 210 may identify a new, higher sub-range for optimum performance.

When data point 393 arrives, it shows that for 3.0 concurrent transactions there is again a performance of 8.8 MB/sec data through-put. This 8.8 MB/sec performance value may be stored in (associated with) the 2.0-3.0 sub-range and averages with the other stored values of that sub-range to arrive at an average performance value of 8.1 MB/sec (as shown in column 373). As performance analyzer engine 210 also maintains a window of data points (following a FIFO order), the addition of the 8.8 MB/sec performance value also may cause the removal of the 5.8 MB/sec performance value in sub-range 3.0-4.0. As the sub-range 3.0-4.0 now contains no performance value (e.g. has a performance value set to null) and sub-range 3.0-4.0 is adjacent to the 2.0-3.0 sub-range, now having the best performance value, performance analyzer engine 210 may expand the search range to include sub-range 3.0-4.0 in column 373 (as indicated by the shaded boxes). Performance analyzer engine 210 may further set New_Throttle_Max and New_Throttle_Min values to 4.0 and 3.0, respectively, to gather data for the 3.0-4.0 sub-range.

When data point 394 arrives, the data values show that for 4.0 concurrent transactions there is a performance of 9.8 MB/sec data through-put. The 9.8 MB/sec performance value may be stored in (associated with) the 3.0-4.0 sub-range. The 9.8 MB/sec performance value is also the best performance value and sub-range 3.0-4.0 becomes the sub-range having the best performance value. As sub-range 4.0-5.0, which is adjacent to sub-range 3.0-4.0, contains no performance value (e.g. has a performance value set to null), performance analyzer engine 210 may expand the search range to include sub-range 4.0-5.0 in column 374. Performance analyzer engine 210 may further set New_Throttle_Max and New_Throttle_Min values to 5.0 and 4.0, respectively, to gather data for the 4.0-5.0 sub-range.

When data point 395 arrives, the data values show that for 5.0 concurrent transactions there is a performance of 10.0 MB/sec data through-put. The 10.0 MB/sec performance value may be stored in (associated with) the 4.0-5.0 sub-range. As 10.0 MB/sec is the best performance value, sub-range 4.0-5.0 becomes the sub-range having the best performance value. Sub-range 5.0-6.0, which is adjacent to sub-range 4.0-5.0, contains no performance value (e.g. has a performance value set to null), and in such a circumstance performance analyzer engine 210 may expand the search range to include sub-range 5.0-6.0 (as shown in column 375). Performance analyzer engine 210 may further set New_Throttle_Max and New_Throttle_Min values to 6.0 and 5.0, respectively, to gather data for the 5.0-6.0 sub-range.

Data point 396 then arrives; showing that for 6.0 concurrent transactions there is a performance of 9.8 MB/sec data through-put. The 9.8 MB/sec performance value may be stored in (associated with) the 5.0-6.0 sub-range. As the 9.8 MB/sec value of the 5.0-6.0 sub-range, is lower than the 10.0 MB/sec value of the 4.0-5.0 sub-range, the 4.0-5.0 sub-range remains as the sub-range having the best performance value. At this juncture as shown in column 376 performance analyzer engine 210 has re-established sub-range for optimum performance at sub-range 4.0-5.0. From column 361 to 376, performance analyzer engine 210 has tested the optimum sub-range (sub-range having the best performance value by including new adjacent sub-ranges into the search range, as the performance values for those sub-ranges become re-set to null (based on the moving window of points). Though out this analysis, in this example, the search range in columns 361-376 has stayed within the identified sub-ranges from 0.0 to 25.8, and hence, in this example, the top and bottom sub-ranges have remained 21.5-25.8 and 0.0-1.0, respectively. However, in other examples, as the search ranges change, other sub-ranges may be creates and the top and bottom sub-ranges may change as the set of identifies sub-ranges expands.

Interface

Referring again to FIG. 2, performance analyzer engine 210 and system controller 108 may communicate, as stated, using controller interface 212. Other interfaces may also be established such as an interface between system 104 and data collector 208 and data collector 208 and performance analyzer engine 210 (e.g. 226). In accordance with one embodiment, controller interface 212 may be general and simple so performance analyzer engine 210 may be used for system controller self (automatic)-tuning in a variety of different systems and applications. However, in non-generic applications, specialized interfaces between system controller 108 and performance analyzer engine 210 may also be employed.

Controller interface 212, for example, may permit system controller 108 to receive data to limit the maximum and/or minimum value of a control variable. In one example, interface modules of controller interface 212 facilitate bidirectional data communication between system controller 108 and performance analyzer engine 210. This bidirectional data communication may include new control parameter settings (new Min/Max settings) 112 passed from the performance analyzer engine 210 to system controller 108 and current control parameter settings (current Min/Max settings) passed from system controller 108 to performance analyzer engine 210.

In accordance with one embodiment, the computer program code for system controller 108 may implement an interface (e.g. as part of controller interface 212) that may specify the way for passing the Min/Max values to system controller 108 and also for receiving Min/Max control value settings from system controller 108. Implementing an interface is a computer science programming technique used in some object-oriented programming languages that allows an object to be defined where that object must have in its programming certain routines (or methods) that are declared in the interface. In one example, where system controller 108 is implemented using a computer programming language such as Java, or C#, system controller 108 may implement an interface that declares "get" and "set" methods for setting in and getting from system controller 108 minimum and maximum control values (e.g. $N_{tran}$ Min/Max). The following pseudo code in Java for example, represents controller interface 212 that system controller 108 may implement to allow performance analyzer component 110 (e.g. data collector 208 and performance analyzer engine 210) to receive and transmit (get and set) control parameter information for the system controller:

```
public interface Controller {
    public double getControlRangeMin( );
    public double getControlRangeMax( );
}
public interface MaxController extends Controller {
    public void setControlRangeMax(double max);
}
public interface MinController extends Controller {
    public void setControlRangeMin(double min);
}
```

In such an example, system controller 108 may implement either the MaxController or MinController interface or both, depending on the capabilities of the system controller. Performance analyzer engine 210 may use the setControlRangeMin and setControlRangeMax methods implemented by system controller 108 to fine-tune a control parameter setting for an optimal system performance. Performance analyzer engine 210 may also use the getControlRangeMin and Max methods to acquire current control parameter settings. In one example where system controller 108 is a throttle, system controller 108 may limit the maximum number of transactions concurrently processed by system 104, but system controller 108 may have no control of the minimum. In such an example, system controller 108 may only implement the MaxController interface. In other implementations, system controller 108 may control the minimum of the control variable range, or may be able to control both the minimum and maximum.

In another example, system controller 108 may control the packet size for data sent over an IP connection by either combining smaller packets into larger ones, or splitting larger packets into smaller ones. In such an example, there may be an optimal packet size range system controller 108 may control from both a minimum and maximum perspective. In such an example system controller 108 may implement both the MaxController and MinController interfaces (e.g. allowing performance analyzer engine 210, for example, to get initial min/max control range settings, and to set both the min and max of the control range of system controller 108).

In addition to the above, the programming code of performance analyzer engine 210 may also implement an interface (e.g. as part of 226) such as the following (provided in Java pseudo code):

```
public interface PerformanceAnalyzer
{
    public void setController(Controller controller);
    public void submitDataPoint(double controlValue, double performance);
}
```

In this example, the setController method may be called when the performance analyzer engine 210 is initialized to specify the system controller 108 that performance analyzer engine 210 is to regulate. When performance analyzer engine 210 is implemented using an interface such as the PerformanceAnalyzer interface, the submitDataPoint method may be called by the element providing data, such as data collector 208 (or system controller 108 or other object), to transfer updated V, P values 218 (e.g., number of active transactions and associated performance) to the performance analyzer engine 210 on a periodic basis. It is noted that although data collector 208 is shown in the example of FIG. 2 as an element of performance analyzer component 110, data collector 208, in another example could be a component inside system 104 or data collector could be maintained as a separate component (apart from system 104 or performance analyzer component 110. In different examples, system 104 may call data collector 208 to provide data on performance (e.g. performance measure 106, a P value), or data collector 208 could call the system to get that performance data. Control parameter input value (a V value) could either come from system controller 108 (as is depicted in FIG. 2) or system 104, for example. For operation of performance analyzer engine 210, some data collector component may be available to collect performance data concerning system 104 as it relates to the current level of input being allowed through system controller 108.

Following the examples above, data collector 208 may be a component associated with the overall system that collects the performance data and relates it to the control value (e.g. number of active transactions) at the time the performance data was taken. Data collector 208 may then send the data, e.g. as a stream of V, P values 218, to performance analyzer engine 210. In such an example, system 104 may be sending performance data to data collector 208 on a periodic basis, or data collector 208 may be calling system 104 to get performance data on a periodic basis (which may be performed using an interface such as that described above for communication with system controller 108). Alternatively, data collector 208 may be configured to measure the performance itself. In each example, where performance analyzer engine 210 implements an interface, a method, such as submitDataPoint may be used to pass data from data collector 208 to performance analyzer engine 210. Interfaces between system 104 and data collector 208 and system controller 108 and data collector may also be specified in a manner similar to those specified for the bidirectional communication between system controller 108 and performance analyzer engine 210.

Following this example, performance analyzer engine 210 may incorporate each new data point received from data collector 208 with other data already received (and perform an analysis, such as that described with reference to FIGS. 3A-B) and store the data points and analysis data in database 222). In one example implementation, database 222 may be kept in memory (e.g. in RAM). Where the number of data points stored may be limited to a set value such as MAX_DATA_POINTS, the amount of memory that is used for storing data points may also be limited. In an alternative example, database 222, may also be a persistent database (stored in persistent memory, such as on a hard drive), but, in one embodiment, the performance analyzer engine 210 can operate without a persistent database. If the computer system 202 goes down and the memory is lost, performance analyzer component may start over, acquiring new data when computer system 202 is brought back up.

Performance analyzer engine 210 may use accumulated data (e.g. 222), for example, to determine if the current control range is appropriate (e.g., operation at optimal, or near optimal point) or determine if the system controller 108 control range could be adjusted by calling the setControlRangeMax and/or setControlRangeMin methods.

Floating point numbers (e.g. double precision floating point numbers) may be used to express both control values and performance values in order to give the most flexibility in terms of the types of control values and performance values that can be used with performance analyzer engine 210. Other type variables, such as integer values, in some examples, may also be used.

Figure 4:
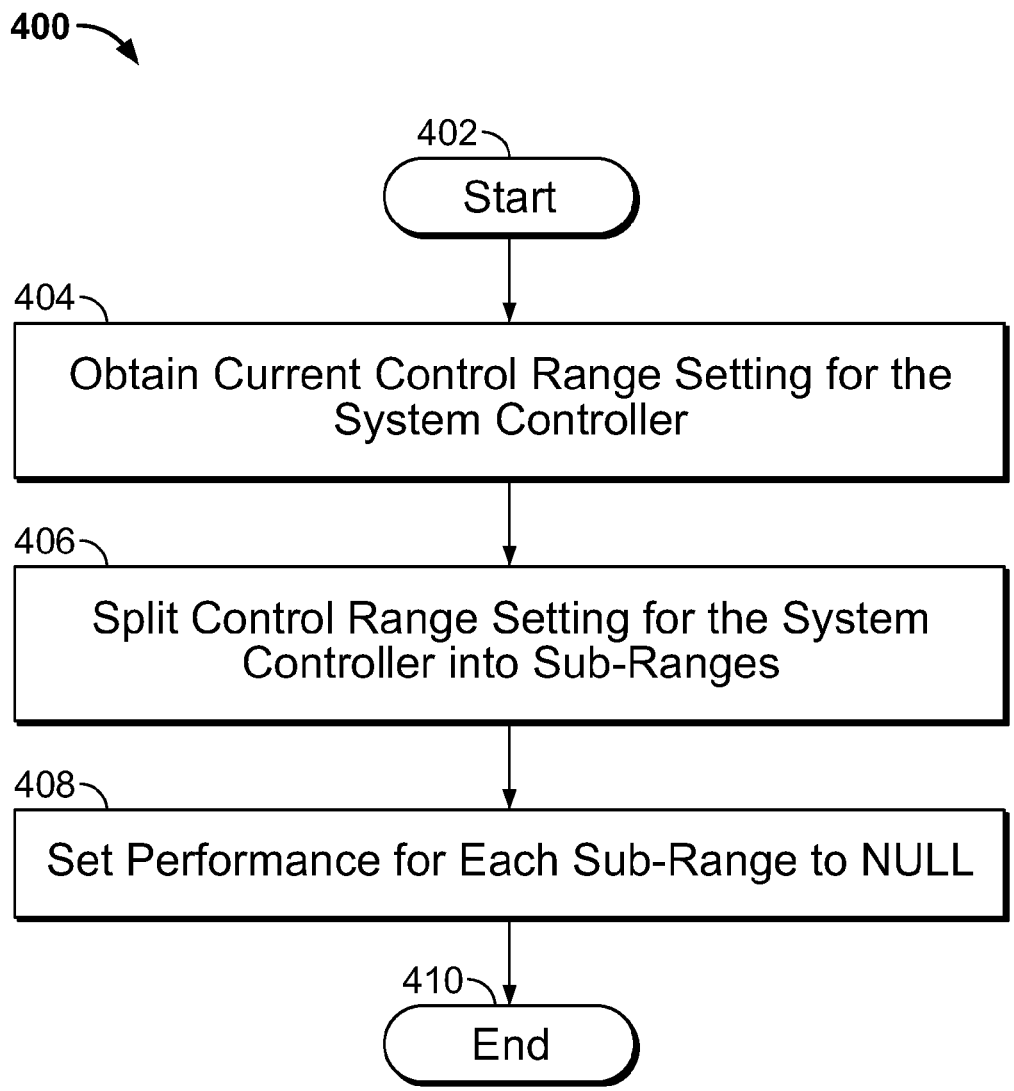
FIG. 4 illustrates an initialization process in one embodiment.

It is also noted that controller interface 212, as realized using interface declarations available through programming languages such as Java and C#, are just one way of providing an interface, for example, between system controller 108 and performance analyzer engine 210 (and between data collector 208 and performance analyzer engine 210). An interface as provided by programming languages like Java and C# is a formal way to express the call methods a piece of code must have without having to specify the implementation details. When other programming languages are used, other techniques beyond the declarations of an interface may be followed. In one embodiment, all that is needed is some method for performance analyzer engine 210 to get the current settings for the min and max of the control variable from system controller 108, and some method also for performance analyzer engine 210 to be able to set the min and max for the system controller 108. Where other computer languages do not support the explicit declaration of an interface, it is still understood in the design that other ways of making these calls, e.g., via calling a method, function, subroutine, etc. are also possible and have equivalent functionality Process Flows Reference is now made to FIG. 4 and FIGS. 5A-C, which illustrate processes 400 and 500 for operating a performance analyzer engine (e.g. 210) in one embodiment. Referring to FIG. 4, performance analyzer engine 210, operated by processor 204, for example, may execute process 400 (after a method, such as the setController, is called to identify to performance analyzer engine 210 the system controller 108 that will be used to send calls to). Process 400 may provide an initialization procedure for data analysis.

In FIG. 4, process 400 may begin at step 402, and at step 404, performance analyzer engine 210 may obtain a current control range setting(s) for system controller 108. For example, system controller 108, operating as a throttle, may have a current system control setting to limit the maximum number of concurrent transactions to 100. The minimum number of concurrent transactions in such an example would be 0. (As stated, a throttle may only limit the maximum, so the minimum for a throttle may be the smallest value possible, which in this case is 0. This may not be true for other types of system controllers). At step 404, process 400 may obtain the range, e.g. the values 0 and 100, as min and max control range settings.

The initial range may then be split, in step 406, into a number of smaller ranges (or sub-ranges). A value such as RANGE_VARIANCE, for example, may be maintained by performance analyzer engine 210 to create a percentage size increase (or decrease) from the beginning of one sub-range to the next. A RANGE_MIN_DELTA value may also be used by performance analyzer engine 210 to set a minimum sub-range size (e.g. 1, 5, etc.).

For example, if in step 406, performance analyzer engine 210 obtains a range from 0 and 100 initially, performance analyzer engine 210 may the split this range into sub-ranges based on the RANGE_VARIANCE value and the RANGE_MIN DELTA value. The RANGE_VARIANCE value may allow the sub-ranges to be determined based on the size of the initial range, whatever that is. For example, if the initial range was in the millions (e.g. between 0 and 1,000,000), setting the sub-ranges to have a size of 10 units would generally be too small. On the other hand, if the initial range of values was less than 10, then having sub-ranges sized to be of 10 units would be too large. An embodiment may provide that the sub-ranges chosen are proportional to the initial range of values using, for example, the RANGE_VARIANCE value.

From the example above, if the initial range was from 0 to 100 units and the RANGE_VARIANCE value was, for example, twenty percent (20%), then sub-ranges may be determine as shown in the following table:

TABLE I

Example Determination of Sub-Ranges Using a RANGE_VARIANCE Value of Twenty Percent (20%)

| Starting Value | RANGE_VARIANCE | Units in Sub-Range (Rounded Decimal Values shown in parentheses) | Sub-Range |
|---|---|---|---|
| 100 | .20 (20%) | 100 * (.20) = 20 | 80-100 |
| 80 | .20 (20%) | 80 * (.20) = 16 | 64-80 |
| 64 | .20 (20%) | 64 * (.20) = 12.8 (13) | 51-64 |
| 51 | .20 (20%) | 51 * (.20) = 10.2 (10) | 41-51 |
| 41 | .20 (20%) | 41 * (.20) = 8.2 (8) | 33-41 |
| 33 | .20 (20%) | 33 * (.20) = 6.6 (7) | 26-33 |
| 26 | .20 (20%) | 26 * (.20) = 5.2 (5) | 21-26 |
| 21 | .20 (20%) | 21 * (.20) = 4.2 (4) | 17-21 |
| 17 | .20 (20%) | 17 * (.20) = 3.4 (3) | 14-17 |
| 14 | .20 (20%) | 14 * (.20) = 2.8 (3) | 11-14 |
| 11 | .20 (20%) | 11 * (.20) = 2.2 (2) | 9-11 |
| 9 | .20 (20%) | 9 * (.20) = 1.8 (2) | 7-9 |
| 7 | .20 (20%) | 7 * (.20) = 1.4 (1) | 6-7 |
| 6 | .20 (20%) | 6 * (.20) = 1.2 (1) | 5-6 |
| 5 | .20 (20%) | 5 * (.20) = 1 | 4-5 |

TABLE I-continued

Example Determination of Sub-Ranges Using a
RANGE_VARIANCE Value of Twenty Percent (20%)

| Starting Value | RANGE_VARIANCE | Units in Sub-Range (Rounded Decimal Values shown in parentheses) | Sub-Range |
|---|---|---|---|
| 4 | .20 (20%) | 4 * (.20) = 0.8 (1) | 3-4 |
| 3 | .20 (20%) | 3 * (.20) = 0.6 (1) | 2-3 |
| 2 | .20 (20%) | 2 * (.20) = 0.4 (1) (from RANGE_MIN_DELTA) | 1-2 |
| 1 | .20 (20%) | 1 * (.20) = 0.2 (1) (from RANGE_MIN_DELTA) | 0-1 |

In this example, the low values of the sub-ranges are not inclusive (so, for example, a value of 11 for the sub-ranges may be placed into the 9-11 sub-range, not the 11-14 sub-range). If the highest starting value in the initial range value is 100, then the top (highest) sub-range would have a size of 20 units (20% of 100) and that would set a top sub-range from (80-100). Then starting with a value of 80 next sub-range would have a size of 16 units (20% of 80) and be from (64-80). As shown in the table above, this process may continue taking 20% of a starting value until all of the sub-ranges are established. According to one embodiment, a minimum range size value, such as for example, RANGE_MIN_DELTA, may be used (in this example RANGE_MIN_DELTA is set to 1), so that at the lowest values, process 400 doesn't continue to forever create smaller and smaller ranges.

It is also noted that while RANGE_VARIANCE is set to be 20% in the example above, it can be configured to a different value. Twenty percent (20%), however, may be usable for generating sub-ranges ranges and the 20% value may have applicability in a variety of implementations. Where the system controller may be monitoring the processing of items like transactions, a RANGE_MIN_DELTA value of 1 (or other integer number) may be used, since number of transactions is typically limited to a whole integer number. In processing a number of transactions, it may not make sense to try to limit the number of transactions to a fraction, such as a half of a transaction. However, there may be other types of systems where a RANGE_MIN_DELTA value of less than 1 (e.g. a fractional value) or greater than 1 may be suitable. Also in the example of Table 1, the values for the sub-ranges were calculated starting from the highest value (100) and then proceeding to lower values (moving to 0). In other examples (e.g. as shown by FIGS. 3A-B) the values for the sub-ranges may be calculates starting from the lowest value (e.g. from 0) and then proceeding to higher values.

At step 408, performance analyzer engine may set performance values for all of the sub-ranges to be NULL (or no-value). Zero may also be used for an initial performance value setting for the sub-ranges, where it is possible to or one does not, for example, distinguish between a zero initial setting and a zero calculated performance value. In step 410, procedure 400 terminates.

Figure 5A:
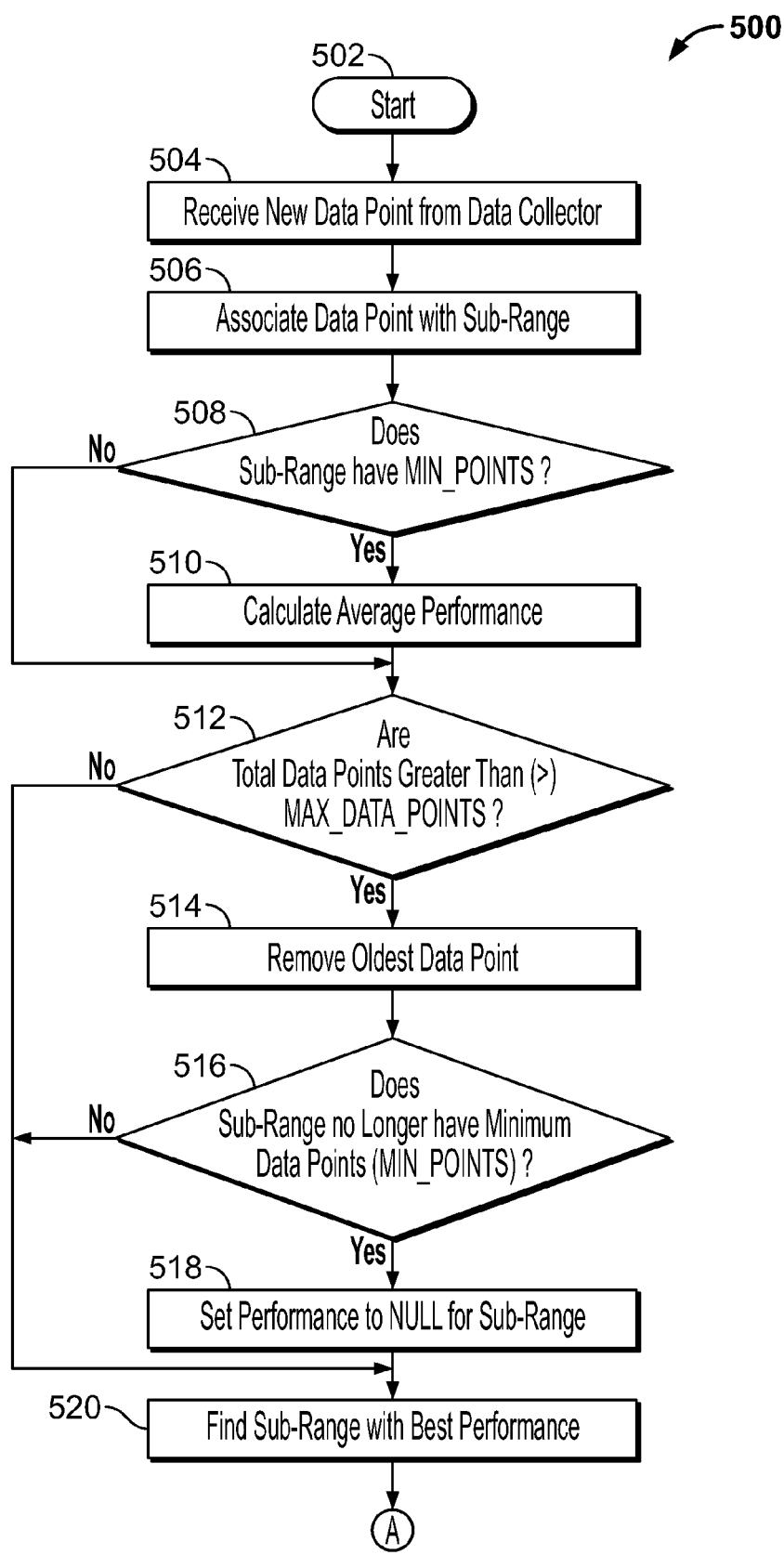
FIGS. 5A-C illustrate an analysis process in one embodiment.
Figure 5B:
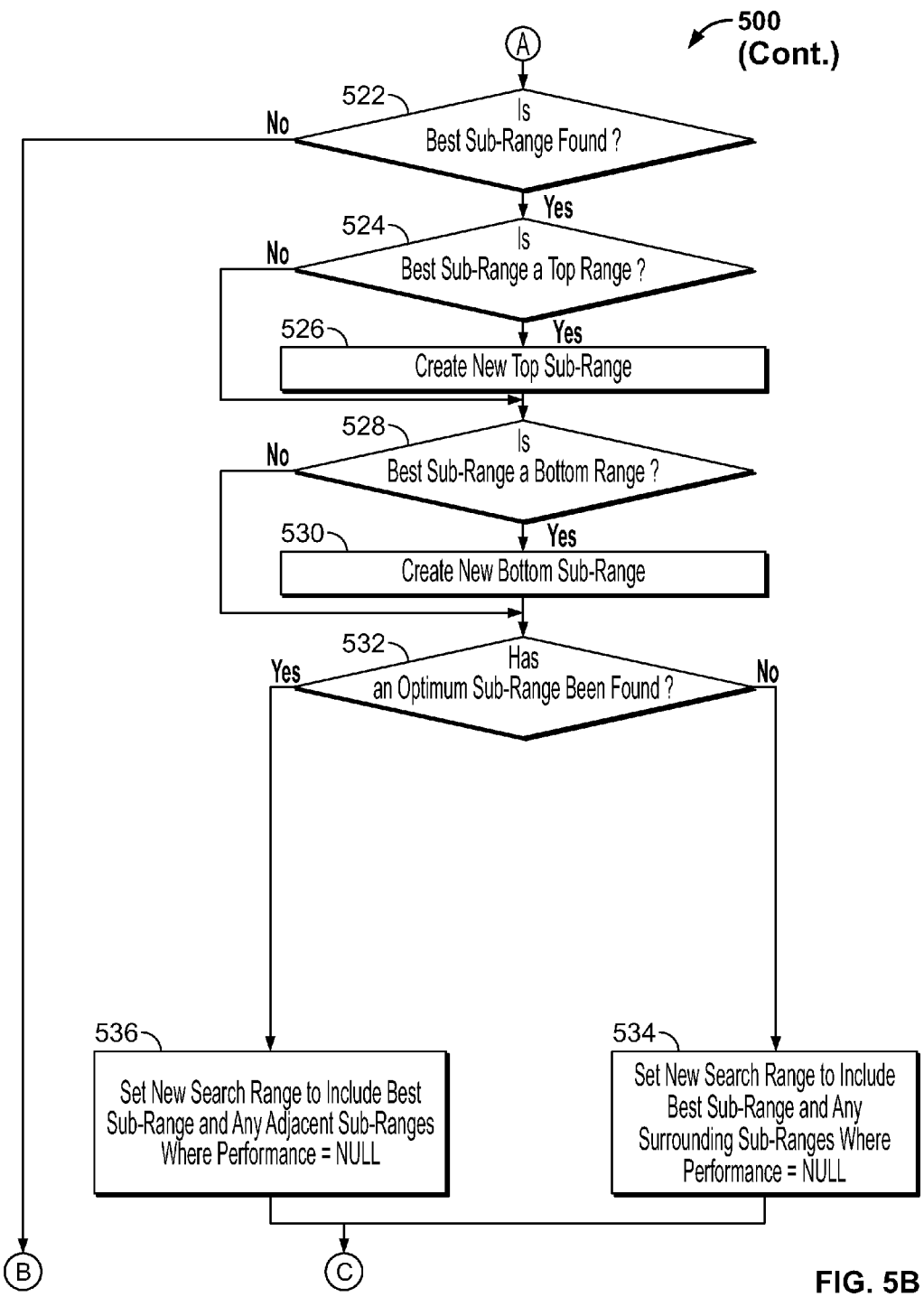
Figure 5C:
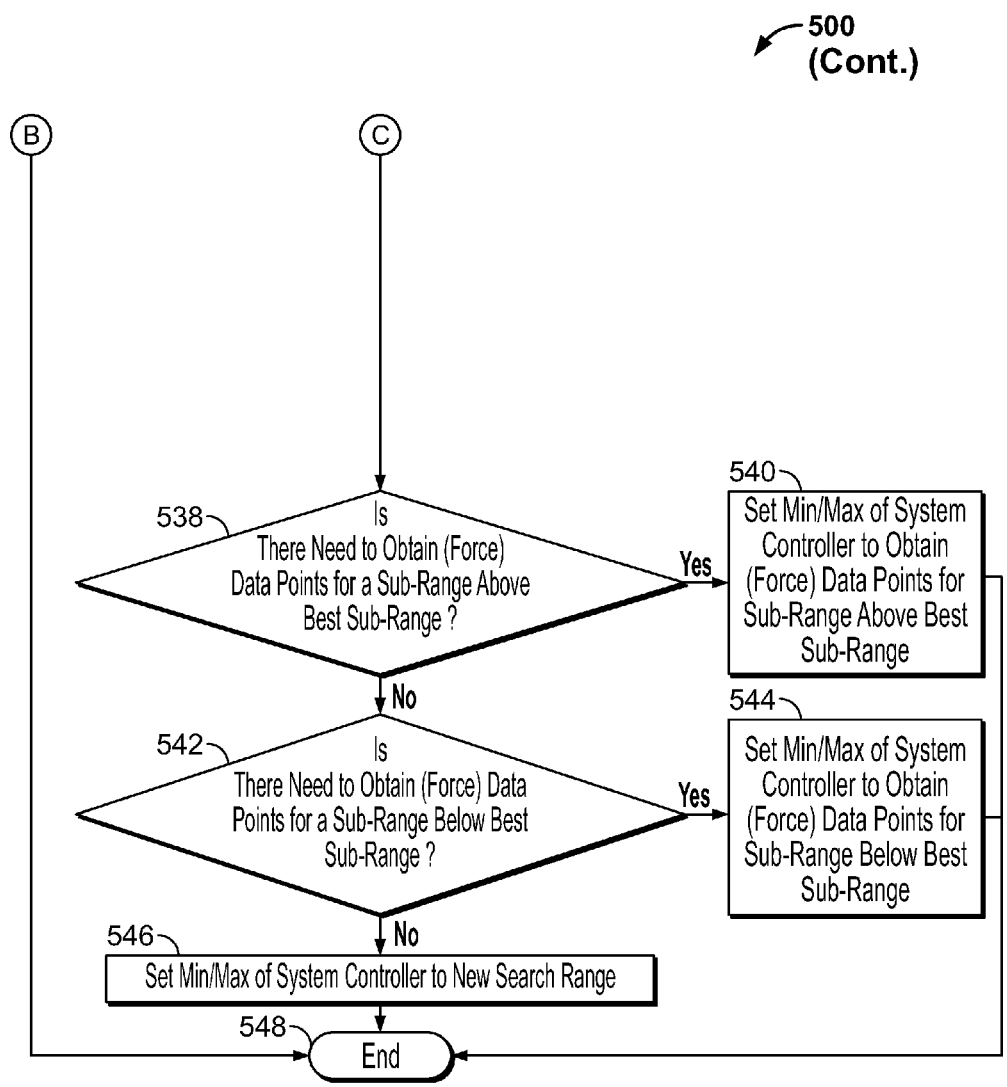

Reference is now made to FIGS. 5A-C, which illustrate process 500 for data analysis according to one embodiment. Performance analyzer engine 210, operated by processor 204, for example, may execute process 500. Referring now to FIG. 5A, at step 502 the process starts, and at step 504 performance analyzer engine 210 may receive a new data point (e.g. from data collector 208), and the receipt of the new data point triggers the execution of process 500. As stated, data collector 208 may collect V, P data points, where V may be the average value of the variable being controlled for a period of time and P may be the average performance of system 104 for that same period of time. In an example where system 104 is an IAP archiving server, V may be the number of active transactions at a given instant and P may be performance data on system 104 (e.g. the rate at which data is being stored in MB/sec). Data collector 208 may send a data point to performance analyzer engine 210 one point at a time (e.g. on a periodic basis, such as every 1, 2, 3, etc. minutes) by calling a method such as submitDataPoint( ) The receipt of a data point initiates process 500, e.g. starting from step 504. Process 500 may be executed for each point sent (each call to submitDataPoint( )). Data collector 208 may provide a stream of data points to performance analyzer engine 210, where process 500 executes each time a data point of the stream is received.

At step 506, performance analyzer engine 210 may add the data point received (in step 504) to the appropriate sub-range, thereby storing or otherwise associating the data point with the particular sub-range. For example, where an initial range 0-100 has been divided into sub-ranges, e.g. 0-30, 31-60 and 61-100 and a data point has a V value of 50.0, the performance value P may be stored in (or associated with) sub-range 31-60.

Performance analyzer engine 210 may then check at step 508 to determine if the number of data points collected for that sub-range (where the new data point in step 506 is associated) are greater than a minimum floor. As stated, a minimum floor value, such as MIN_POINTS (e.g. 302, FIGS. 3A-B), may be set for the sub-ranges, and an average performance value for a sub-range may be calculated if the number of data points collected for the sub-range in question is equal to or above the MIN_POINTS value. Initially, performance analyzer engine 210 may not have data, and the sub-ranges may not contain any average performance calculations (e.g. all of the sub-ranges initially may have performance values set to NULL or no value). As data collector 208 sends new data points to performance analyzer engine 210 (e.g. at step 504), the engine may add (or associate) each new data point to the particular sub-range the control value falls into (e.g. at step 506).

Performance analyzer engine 210 may further calculate an average performance value for the sub-range, for example where the sub-range has received at least a minimum number of data points (MIN_POINTS). In such an example, if at step 508 the number of data points collected for the sub-range is equal to or greater than the MIN_POINTS value, the performance analyzer engine 210 may proceed to step 510 to calculate an average performance value for the sub-range (e.g. using the P values from the data points). If in step 508, the number of data points for the sub-range in question is below MIN_POINTS, performance analyzer engine 210 may proceed to step 512 without calculating an average performance value. In one example, as shown in FIGS. 3A-B (at box 302), MIN_POINTS may be set to 1 and hence a performance value for the sub-range may be calculated using just one associated data point.

Basing the performance value calculation on a number of data points, such as a MIN_POINTS number greater than one, may allow for system performance values to be less sensitive to noise. However, the system provides results even where MIN POINTS is set to 1.

At step 512, performance analyzer engine 210 may further proceed to check the total number of data points currently being associated with each of the sub-ranges (checking on the points of the window of data points for analysis). If at step 512 the total number of data points being analyzed (including the new point from step 504) is less than a MAX_DATA POINTS value (see, e.g. box 352 FIGS. 3A-B), then performance analyzer engine 210 may proceed to step 520 to continue processing.

However, if at step 512 the total number of data points currently associated with the sub-ranges (including the new point) is greater the MAX_DATA POINTS value, then at step 514 performance analyzer engine 210 may remove one of the previously associated data points, such as the oldest (earliest-received) data point (moving the window of analysis to the most recent points). Performance analyzer engine 210 may then check, at step 516, to determine whether the sub-range where the removed data point was previously associated now has a sufficient number of data points to calculate the average performance value. If at step 516, the sub-range where the oldest data point was deleted does not have a sufficient number of data point remaining to calculate an average performance value (for example the remaining data points in that sub-range are now less in number than the MIN_POINTS value), the performance analyzer engine 210, may then, at step 518, set the average performance value for that sub-range to NULL (or no value).

In one example, the average system performance value for the sub-range in question may be calculated when a point is added, not when a point is discarded from the analysis window. In another example, the system performance for a sub-range may be re-calculated, for example, so long as the remaining data points are in number greater than the MIN_POINTS value. Additionally, if the number of points for the sub-range in question drops below the MIN_POINTS value, the performance calculation for that sub-range may be set to null, unless. for example, the sub-range was the sub-range having the current best performance value.

At step 520, performance analyzer engine 210 may next proceed to locate or determine the sub-range having the best average performance value (e.g. from all of the sub-ranges having average performance values that have been calculated and are not, or have not been set to, NULL).

Performance analyzer engine 210 may identify, at step 520 the sub-range having the best (e.g. highest) average performance value for all of the sub-ranges having average performance values, disregarding, for example, those sub-ranges that do not yet have performance calculations. Such a sub-range having the best average performance value (of all sub-ranges having values) may identify a best performance also for the system. For example, where performance analyzer engine 210 is controlling a system controller that is a throttle for an IAP archiving system, performance may be evaluated in terms of data storage through-put, measured, for example, in megabytes (data stored) per second. The sub-range having a best average performance value may indicate a best (or optimal) performance value for the system at a control parameter setting for the system controller that lies within the sub-range. In step 520, the sub-range having the highest average performance value at that instant, may be identified by performance analyzer engine 210 as sub-range having the best performance. Following step 520, performance analyzer engine 210 may continue to steps 522-548 (in FIGS. 5B-5C) for further processing.

Referring now to FIG. 5B, if at step 522, performance analyzer engine 210 does not find a sub-range having a best (e.g. highest) average performance value (for example if no sub-range has a sufficient number of data points needed to calculate an average performance value), the engine may then terminate process 500, moving to step 548, and then wait to receive another data point from data collector 208 (and upon that trigger perform another execution of procedure 500 (steps 502-548). If at step 522, performance analyzer engine 210 does find a sub-range having a best performance value, the engine will continue to step 524.

At step 524, performance analyzer engine 210 may evaluate the found sub-range having the best performance to determine if it is the top sub-range (highest-valued sub-range currently defined/identified by the performance analyzer engine 210). An example of where a top sub-range is found to hold a best performance value are shown in column 312 of FIG. 3A In such a circumstance, where the top sub-range holds the best performance value, performance analyzer engine 210 may, in step 526, create a new top sub-range to be above and adjacent to the old top sub-range (and include in this new, adjacent sub-range range values that are higher than the old top sub-range). For example, in FIG. 3 at column 312, a new top sub-range is created (sub-range 21.5-25.8), where the best performance value is located at the previous top range 17.9-21.5. The average performance calculation for this new sub-range (.e.g. 21.5-25.8) may be set to null, for example, since that sub-range has no data points yet. If in step 524, performance analyzer engine 210 determines that the best sub-range is not the top range (for example, in this instance, there is another higher-valued sub-range identified by performance analyzer engine 210 above (with range values higher than) the sub-range with the best performance value, performance analyzer engine 210 may proceed to step 528.

At step 528, performance analyzer engine 210 may further evaluate the found sub-range having the best performance to determine if it is the bottom sub-range (lowest-valued sub-range currently defined/identified by the performance analyzer engine 210). In FIGS. 3A-B, for example, the bottom sub-range of the search was 0.0-1.0. Where the bottom sub-range of the search is found to contain the best performance value in step 528, performance analyzer engine 210 may create a new bottom sub-range to be below and adjacent to the old bottom sub-range (and having range values that are lower than the old bottom sub-range). The average performance calculation for this newly created bottom sub-range may be set to null since the sub-range has no data points yet. Where the bottom sub-range involves a zero value (such as with sub-range 0.0-1.0, and it does not make sense to create a sub-range with negative values, the creation of the additional bottom sub-range in step 530 may be omitted). If in step 528, performance analyzer engine 210 determines that the sub-range having the best performance is not the bottom range (for example there is another lower-valued sub-range identified by performance analyzer engine) performance analyzer engine 210 may proceed to step 532.

In step 532, performance analyzer may determine if an optimal sub-range has been found. As shown in FIG. 3A, in the initial executions of the search analysis procedure, performance analyzer 210 may include in the search range unexplored sub-ranges that surround the sub-range having the best performance value. For example, for a best performance value found at sub-range 4.0-5.0 in column 315, performance analyzer engine 210 has included surrounding sub-ranges (0.0-1.0), (1.0-2.0), (2.0-3.0), (3.0-4.0) and (5.0-6.0), (6.0-7.2), (7.2-8.6). However, once an optimal performance sub-range is located, performance analyzer engine 210 may expand the search range more sparingly. When an optimal sub-range has been found, performance analyzer engine 210 may not include all surrounding sub-ranges, and may, instead, include only an adjacent range, when the adjacent range has no performance value (see. e.g. columns 323, 324, in FIG. 3A and columns 361, 363, 366, 370 and 373-375 in FIG. 3B).

If in step 532, an optimal sub-range has not been determined (e.g. columns 311-318,before column 319 of FIG. 3A), then performance analyzer engine 210 may proceed to step 534 to set the new search range to include the sub-range having the best performance, and add to the search range any additional, surrounding sub-ranges where performance is equal to NULL. As stated, surrounding may include all sub-ranges having no calculated performance value that are adjacent to each other radiating out, either above (representing system controller settings less than) or below (representing system controller settings greater than) the sub-range having the best performance.

In step 532, if an optimal sub-range has been determined, performance engine 210 may proceed to step 536 to set the new search range to include the optimal sub-range, and add to the search range any adjacent sub-ranges where performance is equal to NULL. Examples of adding adjacent sub-range to the search range may be seen in column 323 and 324 of FIG. 3A and columns 361, 363, 366, 370 and 373-375 of FIG. 3B.

In this execution of step 536, when the optimal sub-range has been determined, the performance analyzer engine may use sub-ranges that are adjacent to the sub-range having best performance to try a sub-range which may be slightly worse performance to verify that the best performance is still in the current best range, but still keeping close to the current best range, for example to maintain a high overall performance.

At steps 538 and 542, performance analyzer engine 210 may further execute procedures to obtain data from sub-ranges either above (covering controller setting values higher than) or below (covering controller setting values lower than) the determined best sub-range, for example, to confirm that the current best sub-range is best. As can be seen in FIG. 3, in the initial parts of the search analysis, performance analyzer engine set New_Throttle_Max values of 20.0, 25.8, 10.4, 5.0 and 3.0 (in columns 311-315) to probe surrounding different parts of the search range for performance data values. Even after identifying an optimal (or near optimal) sub-range, performance analyzer engine 210 may check adjacent sub-ranges to verify that the status of the identified sub-range as optimal (or set system controller 108 to gather new data). Thus, both surrounding sub-ranges (e.g. before an optimum value performance value is determined) and adjacent sub-ranges (after an optimum value performance value is determined) may be checked using steps 538-544.

In the example of FIG. 5C it is also noted that the check for forcing data points to particular sub-ranges is performed using an order where a first check is made (in step 538) to determine if data points should be forced into sub-ranges above (or having range values higher than) the sub-range having best performance and then after (if it is determined not to force above) performing a second check in step 542 to determine if data points should be forced into sub-ranges below (or having range values lower than) the sub-range having best performance. In the example of a saturated throttle, performing a check to force data points above first and below second may provide an advantage as the procedure will move to test the higher throttle control values first (thus possibly finding an optimum performance at a higher control setting). However, in other examples the order of checking may be switched or performed according to a formula such that a check to determine if data points should be forced into sub-ranges below (or having range values lower than) the sub-range having best performance may be performed before the check to determine if data points should be forced into sub-ranges above the sub-range having best performance.

For the checking of adjacent sub-ranges, a check may be performed by having a MAX_DATA_POINTS value (or maintaining a window of current points) where older data points are deleted after time (e.g. to maintain a number of data points at selected value such as MAX_DATA_POINTS).

When an older data point is deleted (or removed from sub-range association), the performance values for the corresponding sub-range of the deleted point (such as a sub-range around the best sub-range) may become set to NULL or no value.

Where a sub-range having no calculated average performance value is adjacent to (next to) the sub-range having a best performance (the sub-range that identifies a best performance for the system), those sub-ranges may checked using steps 538-544, for example. Adjacent sub-ranges include the sub-range that is immediately above (representing control parameter setting values higher than) the sub-range having the best performance and the sub-range immediately below (representing control parameter setting values lower than) the sub-range having the best performance, where those sub-ranges have no calculated average performance value.

However, if performance analyzer engine 210 does not thereafter receive data within this target, adjacent sub-range (e.g. if in the next phase of processing based on the next received data point, the engine doesn't receive data for the sub-range and the sub-range in question is adjacent to and above (e.g. representing control parameter setting values higher than) the sub-range having the best performance, performance analyzer engine 210 may at step 538 determine that there is a need to obtain a data point for the sub-range above the best sub-range. In step 538 performance analyzer engine 210 may determine the need to force data points into the adjacent sub-range above the sub-range having best performance, where forcing as stated includes providing control settings to the system controller to direct system controller 108 to operate at a setting that will allow performance analyzer engine 210 to gather performance data to test or evaluate another setting (or sub-range of settings) for best performance or optimality.

Performance analyzer engine 210 may make this determination in step 538, based on a criteria (a need criteria), such as for example if the data for the sub-range in question has not been returned within a certain number of submitDataPoint calls. In such an example, procedure 500 may include a value such as FORCED LOOKAROUND COUNT, and if the number of submitDataPoint calls is, for example, greater than or equal to the FORCED_LOOKAROUND_COUNT value, performance analyzer engine 210 may determine in step 538 a need to force data to be collected for the sub-range in question.

If the determination to force data to be collected is made, then in step 540, for example, performance analyzer engine 210 may set the control parameter values of system controller 108 (e.g. the $N_{tran}$ Min/Max values) to force, the system controller 108 to generate a data point for the adjacent sub-range (e.g. after checking that system controller 108 is capable of operation in this sub-range).

Performance analyzer engine 210 may set the control parameter to a value to that generates a data point for the adjacent sub-range. With the set control parameter values system controller 108 may operate at the level of the adjacent sub-range and data points may be collected for performance analyzer engine 210 to evaluate.

Because these checks of adjacent sub-ranges may be triggered by the expiration of data points within these sub-ranges, the frequency of these checks can be controlled, e.g., by adjusting the MAX_DATA_POINTS parameter. For example, if new data points are submitted to the performance analyzer every three minutes and MAX DATA POINTS equals a value such as twenty (20), then a data point obtained by performance analyzer engine 210 may be used in analysis (and be associated with a sub-range) for an hour of time.

If in step 538, performance analyzer engine 210 determines there is no need to force data points into the adjacent sub-range above (having range values higher than) the sub-range having the best performance, performance analyzer engine 210 may then proceed to step 542 to determine if there is a need to force data point into the adjacent sub-range below (e.g. representing control parameter setting values less than) the sub-range having the best performance.

As stated above with reference to steps 538 and 540, performance analyzer engine 210 may make this determination based on a criteria (a need criteria), such as for example if the data for the sub-range in question has not been returned within a certain number of submitDataPoint calls (for example, where the number of submitDataPoint calls is greater than or equal to a FORCED LOOKOUT_COUNT value—and still there is no performance value for the sub-range in question). In such a circumstance, performance analyzer engine 210 may make a determination in step 542 that there is a need to force data to be collected for the sub-range below the best sub-range.

If so, performance analyzer engine 210 may in step 544 set the control parameter values of system controller 108 (e.g. the $N_{tran}$ Min/Max values) to force, the system controller 108 to generate a data point for the adjacent, lower-valued sub-range (e.g. after checking that system controller 108 is capable of operation in this sub-range). Performance analyzer engine 210 may set the control parameter to a value to that generates a data point for the sub-range. With the set control parameter values system controller 108 may operate at the level of the adjacent sub-range and data points may be collected for performance analyzer engine 210 to evaluate.

If in step 546, performance analyzer engine 210 determines there is no need to force data points into the sub-range below the sub-range having the best performance, performance analyzer engine 210 may set at step 546 the control range (the $N_{tran}$ Min/Max values) on system controller 108 to the new search range (or in the case of a throttle set the control value to the Max of the search range). Step 546 allows performance analyzer engine to set the control parameter to a value for system performance, based on a search range determined from the current window of data points. And when a data point is received after execution of steps 538-544 (where performance analyzer engine 210 forces data points to be collected in an adjacent sub-range, either above or below, the sub-range having best performance), step 546 allows performance analyzer engine 210 to set the control parameter to a value for system performance, based on a search range determined from a window of data points that includes the (forced) generated data point.

At step 546 (and also for setting values in steps 540, 544), the maximum control value (e.g. $N_{tran}$ Max) may be set, for example by calling the setControlRangeMax method (e.g. for a system controller that implements a MaxController interface) and the minimum control value (e.g. $N_{tran}$ Min) may be set, for example by calling the setControlRangeMin (e.g. for a system controller that implements a MinController interface). Other techniques (e.g. by calling subroutines or otherwise) for setting the minimum and maximum control values (e.g. $N_{tran}$ Min/Max) for a system controller may also be used. After setting the control parameter(s) (e.g. Min/Max values) for system controller 108 in step 546 (and in steps 540 and 544), performance analyzer engine 210 may end (or terminate) processing at step 548, where process 500 may be triggered again (and steps 502-548 re-executed) when performance analyzer engine 210 receives the next data point.

Table II presents, for an embodiment of a performance analysis engine, several configuration parameters that may be adjusted in operation, where the system being controlled is an IAP system based on the IAP 2.1 release from Hewlett Packard Company of Palo Alto, Calif., the system including hardware rack (Part numbers A7970G and BK847GF) with HP IAP 2.1 software (Part number TB751AA) and running tests storing data of varying sizes between 60 KB and 3 MB. (Other parameters and other default values may be used depending, for example, on the type of system being controlled and the data or other control element involved):

TABLE II

Performance Analyzer Parameters for embodiment of a performance analysis engine being used to control a throttle of an HP IAP system (2.1 release) to store data of varying sizes between 60 KB and 3 MB

| Parameter | Description | Sample Setting Value |
| --- | --- | --- |
| MAX_DATA_POINTS | Max number of data points to store in memory | 20 |
| MIN_POINTS | Minimum number of data points to base a sub-range average performance calculation | 3 |
| RANGE_VARIANCE | Percent increase from the beginning of one sub-range to the next | 20% |
| RANGE_MIN_DELTA | Minimum sub-range size | 1.0 |
| FORCED_LOOKAROUND_COUNT | Number of calls of submitDataPoint to wait before setting the controller to force controller values within a target sub-range | 5 |

A performance analyzer in accordance with one embodiment may provide a generic interface and implementation that can be used independently of the underlying protocol. A method of operating a performance analyzer in accordance with one embodiment may use statistical analysis of an arbitrary performance indicator (e.g., throughput) over time to automatically determine the optimal throttle value for optimal, or near optimal, overall system performance. In accordance with one embodiment, the performance analyzer may be effectively decoupled from the specifics of the transport mechanism such that the performance analyzer component is not dependent for a particular type of system or the communication and data transfer protocols used. In contrast, other solutions for performance tuning of a system controller may be specific to networking system and the specific protocols used in the solution.

The performance analyzer may operate without an administrator configuration, and can dynamically adjust the configuration as well as the optimal range, as conditions influencing the performance vary, and the desired set point for system controller configuration changes. The performance analyzer may follow a hill-climb algorithm, with the exception that it may occasionally explore for changing landscapes, as the maxima (setpoint) may vary through time.

A performance analyzer in accordance with one embodiment may control throttling of incoming traffic in a network to optimize throughput in a network. Packet size may be controlled to throughput in a network by controlling both the minimum and maximum of the control variable (e.g., packet size) using the methods described above. The performance analyzer may control concurrency in a central processor unit, or in memory-intensive data processing (e.g., encryption, cryptographic hashing, indexing, etc.) to maximize overall processing rate.

In accordance with one embodiment, a performance analyzer may handle multiple control variables. With a single control variable, the performance analyzer may search a one-dimensional space (control1) for optimal performance by systematically examining the performance of ranges above and below the current range and stepping towards a range that may be adjudged more optimal. With two control variables, the performance analyzer could examine the performance for ranges surrounding the current range in two dimensions (control1, control2). For example, the performance analyzer could be enhanced to explore network traffic throttling along one dimension and packet size along another dimension to find the optimal network throughput. The concept can be expanded even further to N control variables where the performance analyzer is examining an N-dimensional space.

Unless specifically stated otherwise, as apparent from the discussion above, it is appreciated that throughout the specification discussions utilizing terms such as "processing," "computing," "calculating," "determining," or the like, refer to the action and/or processes of a computer or computing system, or similar electronic computing device, for example comprising processors, that manipulate and/or transform data represented as physical, such as electronic, quantities within the computing system's registers and/or memories into other data similarly represented as physical quantities within the computing system's memories, registers or other such information storage, transmission or display devices.

An embodiment may include non-volatile memory or computer-readable storage medium (e.g., register memory, processor cache, RAM, ROM, hard drive, flash memory, CD ROM, magnetic media, etc.) which may include or store code or executable instructions that when executed by a computer, controller or processor may instruct or cause the controller or processor to perform methods discussed herein such as methods for determining an optimal throttle value for achieving optimal, or near optimal, performance in a control system.

The computer-readable medium may be a non-transitory computer-readable media including all forms and types of memory and all computer-readable media except for a transitory, propagating signal. The instructions may include any suitable type of code, for example, source code, target code, compiled code, interpreted code, executable code, static code, dynamic code, or the like, and may be implemented using any suitable high-level, low-level, object-oriented, visual, compiled and/or interpreted programming languages like C, C++, C#, Java, BASIC, Pascal, Fortran, COBOL, assembly language, machine code, or the like.

The processes presented herein are not inherently related to any particular computer or other processing apparatus. Various general-purpose computing systems may be used with programs in accordance with the teachings herein, or it may prove convenient to construct a more specialized processing apparatus to perform the desired method. The desired structure for a variety of these systems will appear from the description above. In addition, it will be appreciated that a variety of programming languages may be used to implement the teachings of embodiments as described herein.

While there have been shown and described fundamental novel features of embodiments, it will be understood that various omissions, substitutions, and changes in the form, detail, and operation of these embodiments may be made by those skilled in the art without departing from the spirit and scope of the embodiments. Substitutions of elements from one embodiment to another are also fully intended and contemplated. Embodiments are defined solely with regard to the claims appended hereto, and equivalents of the recitations therein.

We claim:

1. A method for self-tuning a performance analyzer, the method comprising, with a computer processor:
   splitting a range of values for a control parameter of a system controller for a system into first sub-range having an optimal performance value that identifies an optimal performance for the system, and a second sub-range adjacent to the first sub-range;
   setting the control parameter to a first value within the first sub-range;
   temporarily forcing the control parameter to a second value within the second sub-range to generate a data point for the second sub-range during real-time operation of the system;
   determining a search range from a window of data points that includes the generated data point, wherein the search range includes values of the control parameter that generate better system performance, and wherein the first value is within the search range and the second value is outside of the search range; and
   re-setting the control parameter to the first value for system performance based on the search range.

2. The method of claim 1, wherein temporarily forcing the control parameter to the second value is triggered based on a criteria that a performance value has not been determined for the adjacent sub-range for a period of time.

3. The method of claim 2, wherein temporarily forcing the control parameter to the second value is triggered based on a criteria of:
   counting a number of data points received from a stream of data points; and
   determining whether the total number data points received surpasses a threshold during which time a performance has not been determined for the adjacent sub-range.

4. The method of claim 1, wherein the search range includes a sub-range having a performance value that is not determined.

5. The method of claim 1, wherein the search range includes a plurality of sub-ranges surrounding the sub-range having the optimal performance where the plurality of surrounding sub-ranges each have a performance value that is not determined.

6. The method of claim 1, wherein the search range is determined using a hill-climbing algorithm.

7. A system having a self-tuning performance analyzer, the system comprising a memory and a processor configured to execute program instructions stored in the memory, the memory storing program instructions that when executed by the processor function as a performance analyzer engine configured to:
   split a range of values for a control parameter of a system controller for a system into a first sub-range having an optimal performance value that identifies an optimal performance for the system, and a second sub-range adjacent to the first sub-range;
   set the control parameter to a first value within the first sub-range;
   temporarily force the control parameter to a second value within the second sub-range to generate a data point for the second sub-range during real-time operation of the system;
   determine a search range from a window of data points that includes the generated data point, wherein the search range includes values of the control parameter that generate better system performance, and wherein the first value is within the search range and the second value is outside of the search range; and re-set the control parameter to the first value for system performance based on the search range.

8. The system of claim 7, comprising an interface allowing communication between the performance analyzer engine and the system controller.

9. The system of claim 7, comprising a data collector to transmit a stream of data points to the performance analyzer engine, each data point of the stream comprising a value measuring performance at a point in time of the system and value for the setting of the system controller corresponding to the value measuring performance.

10. The system of claim 9, wherein the value measuring performance of the system is received by the data collector from the system and the value for the setting of the system controller is received by the data collector from the system controller.

11. The system of claim 7, wherein the system is a server system.

12. The system of claim 7, wherein the system is a data archiving system.

13. The system of claim 7, wherein the system controller setting controls a maximum setting.

14. The system of claim 13, wherein the system controller controls a minimum setting.

15. A non-transitory computer readable medium having stored thereon instructions, which when executed by a processor cause the processor to perform the method of:

splitting a range of values for a control parameter of a system controller for a system into a first sub-range having an optimal performance value that identifies an optimal performance for the system, and a second sub-range adjacent to the first sub-range;

setting the control parameter to a first value within the first sub-range;

temporarily forcing the control parameter to a second value within the second sub-range to generate a data point for the second sub-range during real-time operation of the system;

determining a search range from a window of data points that includes the generated data point, wherein the search range includes values of the control parameter that generate better system performance, and wherein the first value is within the search range and the second value is outside of the search range; and re-setting the control parameter to the first value for system performance based on the search range.

16. The non-transitory computer readable medium of claim 15, the method comprising receiving an additional data point in a stream of data points, the generated data point comprising a value measuring performance at a point in time of the system and system controller setting value corresponding to the value measuring performance.

17. The non-transitory computer readable medium of claim 16, the method comprising:

associating the additional data point with a sub-range, based on the system controller setting value; and determining a performance value for the sub-range of the additional data point, based on the value measuring performance of the additional data point, wherein the performance value for the sub-range of the additional data point is determined if a total of the number of data points associated with the sub-range of the additional data point is above a pre-determined threshold.

18. The non-transitory computer readable medium of claim 17, the method comprising removing a previously-associated data point from the window of data points after associating the additional data point with the sub-range, wherein the association of the additional data point causes a total for the number of data points associated with sub-ranges to exceed a pre-determined maximum value.

19. The non-transitory computer readable medium of claim 18, the method comprising:

checking the number of data points associated with the sub-range of the previously-associated data point, after the previously-associated data point has been removed from the window; and setting a performance value for the sub-range of the previously-associated data point to null if the number of data points associated with said sub-range of the previously-associated data point is less than a pre-determined threshold.

* * * * *